United States Patent
Seidel et al.

(10) Patent No.: US 10,931,182 B2
(45) Date of Patent: Feb. 23, 2021

(54) PRODUCTION METHOD FOR A STATOR

(71) Applicant: GROB-WERKE GMBH & CO. KG, Mindelheim (DE)

(72) Inventors: Korbinian Seidel, Mindelheim (DE); Ralf Rauscher, Fellheim (DE); Günter Dreier, Deisenhausen (DE); Simon Fendt, Kirchheim (DE); Tobias Wagner, Rott (DE); Tobias Haggenmueller, Unterthingau (DE); Tobias Wegscheider, Mindelheim (DE)

(73) Assignee: GROB-WERKE GMBH & CO. KG, Mindelheim (DE)

( * ) Notice: Subject to any disclaimer, the term of this patent is extended or adjusted under 35 U.S.C. 154(b) by 255 days.

(21) Appl. No.: 16/082,596

(22) PCT Filed: Mar. 8, 2017

(86) PCT No.: PCT/EP2017/055497
§ 371 (c)(1),
(2) Date: Sep. 6, 2018

(87) PCT Pub. No.: WO2017/153502
PCT Pub. Date: Sep. 14, 2017

(65) Prior Publication Data
US 2019/0074754 A1    Mar. 7, 2019

(30) Foreign Application Priority Data

Mar. 8, 2016 (DE) .................... 10 2016 104 235.8
Apr. 18, 2016 (DE) .................... 10 2016 107 172.2

(51) Int. Cl.
*H02K 15/00*       (2006.01)
*H02K 15/04*       (2006.01)

(52) U.S. Cl.
CPC ..... *H02K 15/0478* (2013.01); *Y10T 29/49011* (2015.01)

(58) Field of Classification Search
USPC .................. 29/596, 598, 605, 606, 732, 868
See application file for complete search history.

(56) References Cited

U.S. PATENT DOCUMENTS

| 2,118,015 A | 1/1964 | Willyoung |
| 4,381,467 A | 4/1983 | Grünewald et al. |

(Continued)

FOREIGN PATENT DOCUMENTS

| DE | 195 49 180 | 7/1997 |
| EP | 1 128 530 A2 | 8/2001 |

OTHER PUBLICATIONS

European Office Action dated Jul. 21, 2020.
International Search Report, dated Jun. 22, 2017 (3 pages).

*Primary Examiner* — Thiem D Phan
(74) *Attorney, Agent, or Firm* — Jacobson Holman PLLC

(57) ABSTRACT

The invention relates to a method for the production of a component, of an electric machine, such as, for example, a stator, comprising a wire mat which is made of wire, preferably flat wire, comprising the following steps: aligning the wire, twisting the wire in at least some sections about its longitudinal axis, z-shaped angling of the wire, winding the wire, in particular winding the wire helically onto a carrier, transferring the wire mat thus obtained onto a mounting tool.

13 Claims, 30 Drawing Sheets

(56) References Cited

U.S. PATENT DOCUMENTS

| | | | | |
|---|---|---|---|---|
| 6,901,649 B2* | 6/2005 | Imori | ............... | H02K 3/14 |
| | | | | 29/596 |
| 7,703,192 B2* | 4/2010 | Sadiku | ............... | H02K 15/0478 |
| | | | | 29/596 |
| 2011/0227443 A1 | 9/2011 | Kamatani | | |
| 2012/0186081 A1 | 7/2012 | Kamatani et al. | | |

* cited by examiner

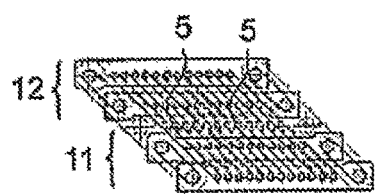 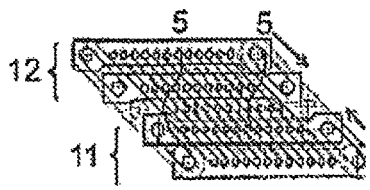 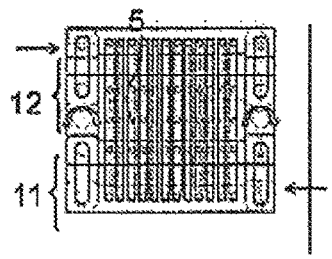
  
Fig. 5A  Fig. 5B  Fig. 5C
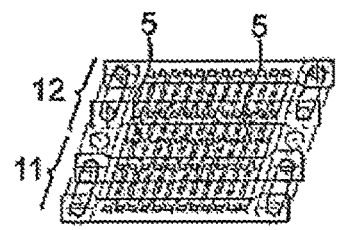 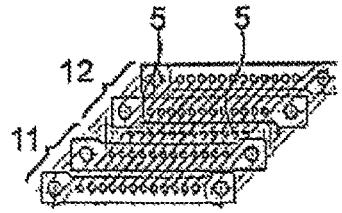 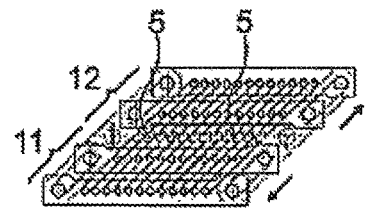
Fig. 5D  Fig. 5E  Fig. 5F

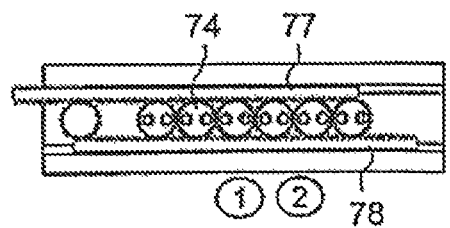
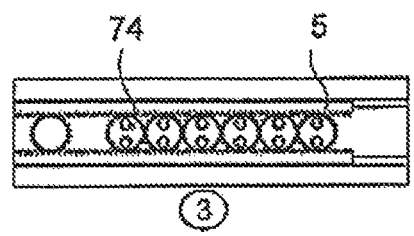
Fig. 39A            Fig. 39B
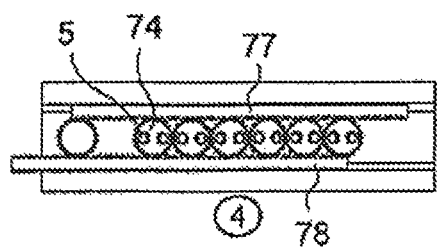
Fig. 39C
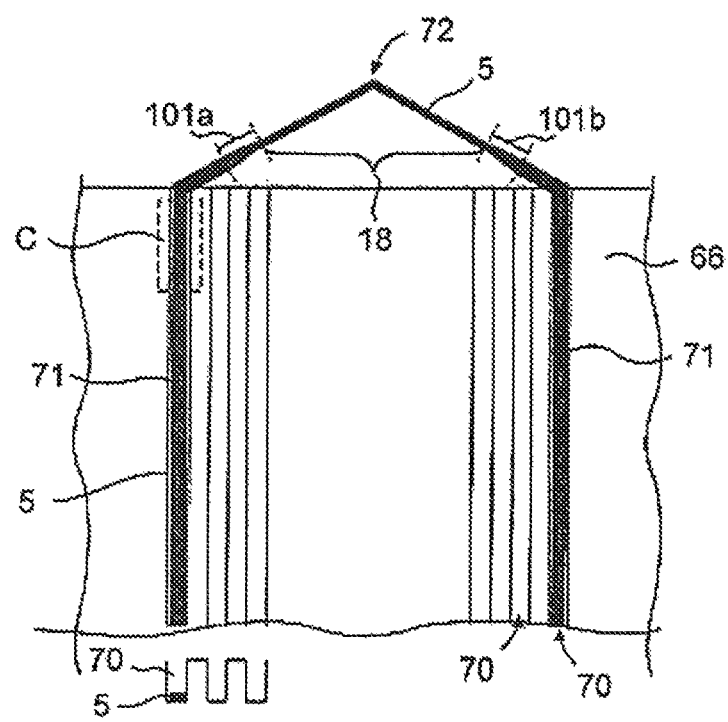
Fig. 40

PRODUCTION METHOD FOR A STATOR

BACKGROUND OF THE INVENTION

The invention relates to a method for manufacturing a component of an electric machine, such as a stator comprising a wire mat formed from flat wire, or a wire mat formed from flat wire for a stator.

The invention expressly relates in general to a component of an electric machine, in particular a wire mat formed from flat wire. Such a wire mat or wire winding is installed in the stator of an electrical machine, and such a stator is a component in the sense of the invention and disclosure described herein.

Moreover, the invention also relates to a device for manufacturing such a component. The method described above, as well as the device, serve to produce a component of an electrical machine, wherein it is precisely the component of the electrical machine, for example the stator, which is improved upon over the prior art.

Therefore, the task of the present invention is to offer proposals which lead to an improved component of an electrical machine.

Usually, the wire, in particular a flat wire stored on a roll, is pulled off of the roll. As the wire is aligned, it is forced into a straight line. A flat wire here is understood to be wire with a square cross section, the ratio of the length of the sides (in cross section) being 1.5:1 or 2:1 or 3:1, for example.

This wire is inserted into the longitudinal groove of a stator or rotor. It is advantageous to select the groove size to be somewhat larger than the shorter cross-sectional side of the wire. This results in the wire inserted in the groove to stand upright. In the groove jump, i.e. when the wire leaves the first groove and is then redirected similar to a pitched roof in an angling and then dips back into the next second groove again, the problem arises that the prior art requires a bending across the short edge, which is a disadvantage since this results in a larger wound structure, generates higher loads on the insulation layer surrounding the wire during bending, and that a greater amount of copper is used per stator.

SUMMARY OF THE INVENTION

In order to avoid these disadvantages, a process for bending across the high edge of the long side, i.e. long cross-sectional side, is carried out. According to the invention this requires that the wire be twisted in sections prior to bending.

The proposals according to the invention therefore lead to a considerable improvement in the component of the electrical machine since the resultant bending radius is substantially reduced when the flat wire is twisted, thereby minimizing the risk that the insulation layer on the flat wire is damaged in this area, which would result in short-circuiting or the like due to the destroyed insulation.

Moreover, one advantage provided in the proposal is that the flat wire of a wire winding is inserted into the groove of the component in such a way that the short cross-sectional side of the flat wire is oriented substantially parallel to the groove depth (i.e. radially in a rotationally-symmetric component) and that the flat wire which exits the groove is first bent by approximately 30° to 60° about the short cross-sectional side thereof, then is twisted by approximately 90° about the longitudinal axis thereof, and then bent by approximately 90° about the long cross-sectional side thereof in this area of twisting, whereupon a counter-directional twist is provided and then the wire dips into the next groove after being bent by approximately 30° to 60° about the short cross-sectional side.

Therefore, among other things the invention comprises the special design of the wire in a stator, the wire, after exiting the groove of the stator or rotor, first being bent by approximately 45° across the high edge 7 or long cross-sectional side 7 thereof (as seen in a sectional view of the flat wire), then being twisted by approximately 90° about the longitudinal axis thereof, then being bent by approximately 90° about the short cross-sectional side thereof in this area of twisting, whereupon the counter-directional twist is provided and then the wire dips back into the groove after being bent by approximately 45° about the long cross-sectional side. The reference signs indicated here refer to FIG. 4 in which wire 5 is displayed in a cross-sectional view. The high edge or long side or cross-sectional side is identified by 7, whereas the narrow side or short edge is given the reference sign 8.

Usually, the wire mat or shaft winding or wire winding to be installed in the stator is made up of a plurality of parallel wires, usually 12 wires. It is clear to a person skilled in the art that the technologies described here easily apply equally well to wire arrangements of multiple parallel wires as they do to single-wire designs.

In a preferred embodiment, of the proposal, a Z-shaped angling of the flat wire is carried out after twisting.

A Z-shaped angling is understood to indicate the fact that most of the wires oriented in a common wire plane, preferably in parallel fashion, are shifted in parallel in the wire plane as shown in FIGS. 6A and 6B, for example.

Moreover, after the Z-shaped angling a winding is performed, in particular a helical winding of the flat wire onto a support, whereupon the thus-generated wire mat is transferred to a mounting tool.

The following advantageous step is also provided in the proposal:

Mounting of the wire mat in the component such that the second untwisted wire areas of the wire mat are guided into grooves of the component, the second untwisted wire areas of different grooves of a flat wire area are connected by an angling and the angling at least partially takes up the first untwisted wire area.

The proposal provides for many different variants. First of all, the angling at least partially takes up the first untwisted wire area. This means that the first untwisted wire area is also located outside the angling, i.e. at the axial end of the groove, for example. Thus, the twisting section is then also provided in the stator (if necessary by widening the groove at the ends thereof), for example, said section being located between the first and the second untwisted wire area.

Alternatively, the angling completely takes up the first untwisted wire area.

There are a variety of alternatives for designing the device.

In an advantageous embodiment, the clamping device and the twisting device are each formed from two interacting jaw parts for temporary clamping the flat wire between the jaw parts. This proposal leads to a discontinuous manufacturing process.

In another preferred embodiment, the clamping device and the twisting device are each formed from two interacting shaping roils, each of which rotates about an axis of rotation. This variant provides a continuous manufacturing process, and the shaping rolls have corresponding guide notches for effecting as positively-fitted a guiding of the flat wire as possible. Through the use of a common tilting of the axes of rotation of the twisting device, twisting is incorporated into the flat wire.

In skillful fashion, the tilt angle is made to be 90°. The flat wire is rectangular as seen in cross section. Therefore, it is sufficient to position the tilt of 90° about the shorter cross-sectional edge or cross-sectional side for the bending.

In a preferred embodiment of the proposal, the twisting device is placed between two clamping devices. In this way, in addition to the first twisting, the counter-rotational twist is also incorporated into the flat wire simultaneously in a single step.

Moreover, the invention, proposes a method for manufacturing a component of an electrical machine, such as a stator, comprising a wire mat formed from a plurality of wires, in particular flat wires, the method comprising the following steps:

Arranging the plurality of wires in a first sequence 1, 2, 3, 4, . . . .

Switching the positions of the wires to form a new, second sequence 2, 1, 4, 3, . . . .

For purposes of carrying out this method, the invention also alternatively comprises a device for changing the sequence of a plurality of wires arranged side-by-side, in particular flat wires, wherein at least one deflection and one crossing station is provided in the device, the deflection station deflecting at least some of the wires to a different wire plane and the crossing station moving some of the wires in a movement at a right angles to the longitudinal extent of the wires such that the sequence of arranged wires changes.

In the process, the deflection and crossing station are at a distance away from one another (in the feed direction of the wire) or are integrated into a single deflection-crossing station.

In the process, use of the device and the method proposed by the invention is variable with respect to the manner in which the wires are fed in. As shown in the Figures, the wires can be disposed side-by-side linearly. However, it is also possible to place the wires in groups or parts which are in multiple rows.

To carry out this method, the invention also comprises a device for changing the sequence of a plurality of side-by-side wires, in particular flat wires, wherein the wires are guided in pairs in wire receptacles and each wire receptacle can be rotated about an axis of rotation, the axes being oriented essentially parallel relative to the longitudinal extent of the wires guided in the wire receptacle.

It was found that electrical machines, for example stators, have better electrical properties, such as a better efficiency, when there is a paired wire exchange provided in certain areas. The device proposed according to the invention and the method associated therewith also result in an improved stator.

In the process, the invention is not only limited to a paired exchange. The proposed method and devices are suitable for implementing an arbitrary new sequence of wires side by side.

The invention also involves a paired exchange of positions of the wires in order to form a second sequence 2, 1, 4, 3, . . . .

Moreover, an advantage is provided in that prior to the paired exchange of positions of the wires, every second wire is deflected to a separate plane and then crossed over the respective first wire. Usually, the wires are guided in a common plane, but the invention is not limited to this situation. Of course, it is also possible for individual wires to be guided in groups or bundles when the corresponding sequence is defined. However, in view of the installed situation in the electrical machine (for example in the stator) it is advantageous for a majority of the wires, if not all wires, to be guided in a common wire plane in parallel. In order to introduce the exchange process, a paired switching of places of the wire position must be provided, i.e. at least every second wire is deflected as described.

Advantageously, a wire supply is formed into every second wire before, during or after the deflection thereof. It is preferable for this wire supply to be designed as a rounding, the invention not being limited to this geometric embodiment. Then, the length difference is compensated during the Z-angling from this wire supply.

It is skillfully provided that the sequence exchange is done prior to the Z-shaped angling.

A significant advantage of the invention is in the fact that the various measures described can also be implemented in a common process or in a single system. Therefore, the invention also involves a system for manufacturing the wire mat or wire winding of a component of an electrical machine such as a stator, for example, the system comprising a device for changing the sequence of a plurality of wires arranged side by side as well as a device for manufacturing a flat wire which is twisted in areas. Such a system combines the above advantages and significantly improves the prior art described above.

In this regard, reference is made in particular to the fact that all features and properties as well as processing methods described in relation to the devices are logically transferable also with regard to the formulation of the method according to the invention and useful in the sense of the invention and are deemed to be co-disclosed. The same also applies vice versa, in other words structural, and thus device-specific, features which are identified relative to the method can also be taken into account and claimed as device claims and also count as part of the disclosure.

Moreover, the invention also involves the use of the device for manufacturing a flat wire twisted in areas for producing a wire mat or wire winding of a stator. In the process, the device comprises at least one first clamping device disposed in the feed direction of the flat wire in front of a twisting device and the twisting device can be tilted by a tilt angle relative to the clamping device, in particular about the longitudinal extent of the flat wire.

It is also clear to a person skilled in the art in this regard that a component of an electrical machine is not only the stator or rotor, but also a wire mat or wire winding, for example.

DESCRIPTION OF THE DRAWINGS

The invention is shown schematically in the drawing in an exemplary embodiment. Shown are:

FIG. 5 consists of FIGS. 5A, 5B, 5C, 5D, 5E and 5F showing a respective twisting machine according to FIG. 3 in various positions together with the respective detail according to FIG. 4;

FIG. 39 consists 39A, 39B and 39C showing in one view a figure sequence of the different positions of the compensation station according to the invention; and FIG. 40 is a detail of the component according to the invention in a schematic view.

DETAILED DESCRIPTION OF THE INVENTION

In the figures, the same elements, or elements that correspond with one another, are identified with the same reference signs and are therefore not described again unless it is useful to do so. The disclosures contained in the overall description are logically analogous and transferable to the same parts that have the same reference signs or the same component names. Also, the positional information selected in the description, such as top, bottom, side, etc., refer to the figure directly described and shown and are logically transferable to the new position when a positional change is made. Furthermore, individual features or featural combinations from the various exemplary embodiments shown and described can represent independent, inventive solutions in their own right or solutions according to this invention.

Figure 1:
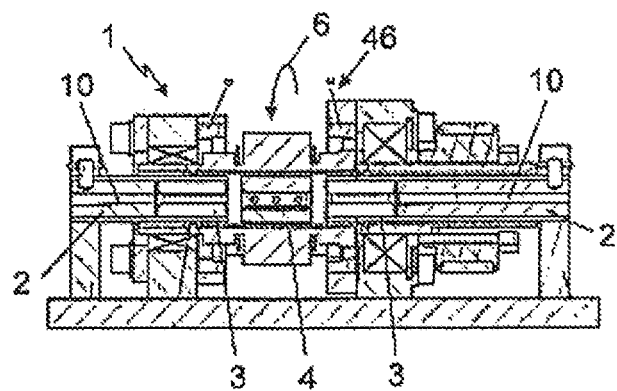
FIG. 1 is a twisting machine according to the invention in a side view.

FIG. 1 shows the twisting machine in a side view. 10 signifies a pass-through channel for wire 5. Channel 10 is located inside of guide bushings 2 disposed at the beginning and end of the machine. The twisting device 4 is provided in the middle centered and comprises jaw parts which can be adjusted relative to the introduced wire. The wire 5 is clamped in the clamping device 3 situated in front and back; the clamping device 3 remains positionally fixed whereas the twisting device 4 pivots about the longitudinal axis of the wire (x-axis), for example by 90° as indicated toy the curved arrow 6.

Figure 2:
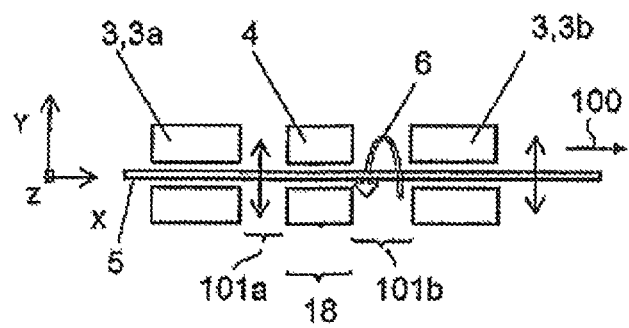
FIG. 2 is the functioning principle of the twisting machine shown in FIG. 1 in a schematic view.

FIG. 2 shows this process schematically. The twisting device 4 is located between the first clamping device 3,3a on the input side and the second clamping device 3,3b on the output side. The feed direction of the wire 5 is indicated by arrow 100.

Both the clamping device 3 and the twisting device 4 comprise cooperating jaw parts, respectively. In the closed state of these devices, in other words when the wire 5 is held thereby, the edges of the flat wire run parallel to one another and also straight, i.e. parallel to the longitudinal extent of the flat wire 5.

As soon as the twisting device 4 is pivoted by 90°, for example, a first twisting section 101a forms in the wire 5 between the first clamping jaw 3,3a and the twisting device 4, and a second twisting section 101b to also forms after the twisting device 4 and the second clamping jaw 3,3a. The twisted area 18 thus forms between the two twisting sections 101a and 101b. In the twisted area 18, the edges of the flat wire again run straight and parallel to one another, whereas the edges of flat wire 5 extend along a curved or helical line in space in twisting section 101a, 101b.

The twisting in the second twisting section 101b is opposite to the twisting in the first twisting section 101a, both in the direction of rotation and the angle of rotation (relative to the longitudinal extent of the wire), this second twisting section 101b is also identified and described in this application as being in counter-directional twist.

Figure 3:
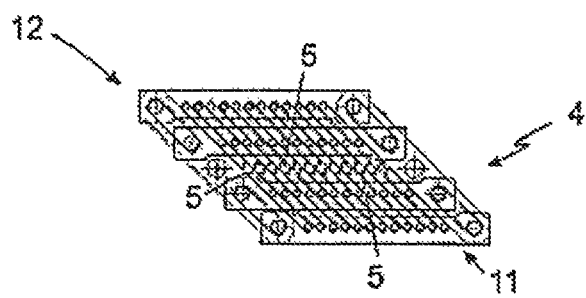
FIG. 3 is a twisting machine for a plurality of parallel wires according to the invention.

FIG. 3 shows a view of the drilling device 4 in a position to twist a plurality of parallel wires 5 about the respective axes thereof. The wires 5 extend at right angles to the plane of the drawing. The twisting jaw 4 comprises a lower part 11 and an upper part 12 which can pivot relative to one another. The lower part 11 and the upper part 12 have respective holders 13,14, each comprising a recess 15 at the front ends thereof facing one another, the recess grasping the wire 5 radially. This is shown in FIG. 4 in particular.

Figure 4:
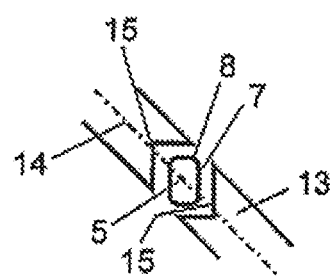
FIG. 4 is a detail of the twisting machine according to FIG. 3, with a cross section of the flat wire.

FIG. 4 shows a detail according to FIG. 3. The upper part 12 is equipped with an upper holder 14 for each individual wire 5, the holder comprising a perpendicular recess 13 formed so as to grasp the wire 5 in a positive-fitting manner. The lower part 11 similarly has a lower holder 13 and a similarly formed recess 15. The wire 5 shown here is designed as a flat wire, i.e. the cross section thereof is rectangular, wherein the individual cross-sectional sides 7,8 are not of the same length. The long cross-sectional side is identified by reference sign 7 and the short cross-sectional side is identified by reference sign 8.

In FIG. 3 and FIG. 4, the twisting device 4 is shown opened, i.e. the recesses 15 do not lie against the flat wire 5.

In the sequence of FIGS. 5A, 5B, 5C, 5D, 5E and 5F, the process sequence for a plurality of parallel wires 5 is shown. The FIG. sequence according to FIGS. 5A, 5B, 5C, 5D, 5E, and 5F involves dual images. The overall view from above corresponds to the view according to FIG. 3, and the detail view corresponds to the view according to FIG. 4. The design is the same as in FIG. 3, and the reference signs apply here analogously.

FIG. 5A shows the base position, corresponding to the representation according to FIG. 3 and FIG. 4. The clamping state using holders 13 and 14 is open.

In FIG. 5B, the clamping is closed. The flat wire 5 is held positively fit by the two holders 13 and 14.

In FIG. 5C, a clockwise rotation of the upper and lower part 11 and 12 by 45° is performed. The holders 13 and 14, which are initially oriented diagonally, are now oriented vertically (compare FIGS. 5A, 5B).

In FIG. 5D, a rotation to 60° is shown and in FIG. 5E a rotation to 90° is shown.

In FIG. 5F, twisting to 90° has been done and the clamping state of the holders 13 and 14 is open. Since the wire is held in position in clamping devices before and after the twisting device, the wire is now twisted in sections and then further cycled in the longitudinal direction of the wire (the x-direction).

Of course, in addition to the process explained here as being discontinuous, a continuous twisting process is also possible, for example designed with co-moving shaping discs of different groove geometries along the periphery.

FIG. 40 shows a detail, of the component according to the invention in a schematic view, in this ease a stator 56. The stator 65 is usually a rotationally symmetric element with a plurality of grooves/internal grooves 70 into which the wires 5, more precisely the straight bars or second untwisted wire areas 71 are placed in a radially outward motion.

In the view shown here, the short cross-sectional side of the flat wire 5 is oriented substantially parallel to the groove depth (radially) and the flat wire 5 which exits the groove 70 is first bent about the short cross-sectional side thereof by approximately 30° to 60°. Then, a twisting section 101a follows the section twisting the flat wire by 90° about the longitudinal axis thereof. In this view, therefore, the width of the wire 5 narrows. Then, a first untwisted wire area 18 follows which includes angle 72, which is approximately 90°. The total area of the flat wire area located outside the groove 70 is called the angling. The arrangement is symmetric relative to angle 72 and the counter-directional twist is implemented in twisting section 101b, whereupon the flat wire 5 dips into the next groove 70 after a small bend.

The dashed area C is intended to indicate that the twisting sections 101a and 101b can alternatively also be located in the stator 66.

The grooves 70 extend over the entire design height of the stator 66. In the lower left area, the installed situation of the flat wire 5 in the groove is shown schematically.

Figure 6A:
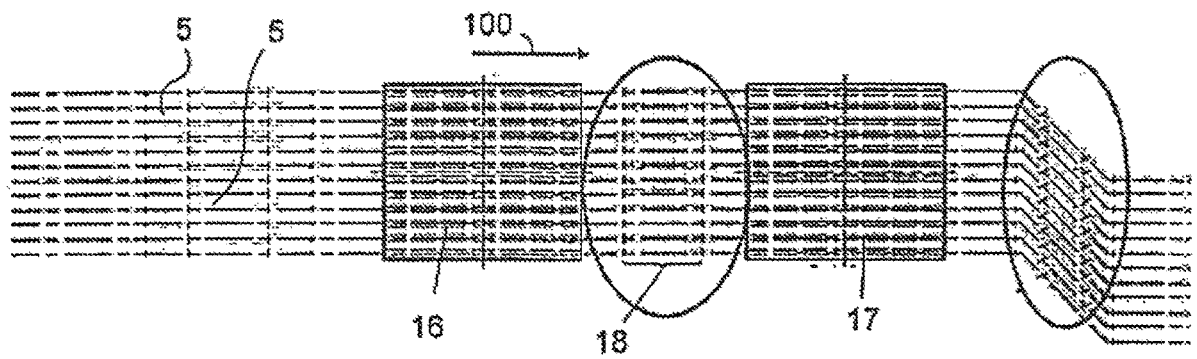
FIG. 6 consists of FIGS. 6A and 6B showing the impressing of the Z-angling in an arrangement of parallel wires according to the invention.
Figure 6B:
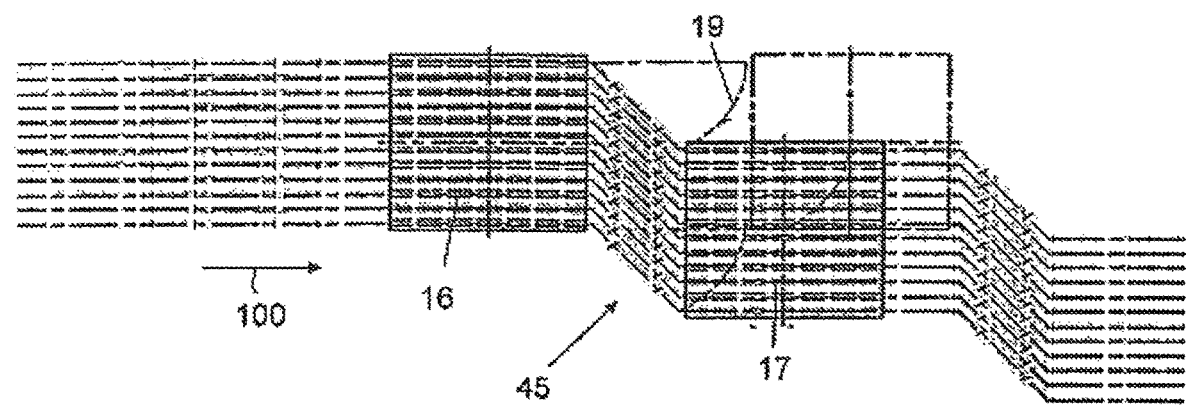

FIG. 6A shows the initial position, FIG. 6B shows the position after a Z-angling has been done or impressing of a Z-angling.

The arrangement of parallel wires 5 is held fixed in a first clamping jaw 16 and a second clamping jaw 17 which is located at a distance from the first in the feed direction 100 of the wire 5. It is clear that each of the clamping jaws 16,17 shown comprises two cooperating jaw sections which, depending on the positions thereof relative to one another, either hold the wire 5 fixed or release it.

The arrangement of the ends of the clamping jaws 16,17 relative to one another is such that a twisted area 18 of the wires 5 exists therebetween, the area not being held fixed by a clamping jaw.

Then, to impress the Z-angling the second clamping jaw 17 is tilted by a tilt motion 19 about a tilting axis which is perpendicular to the wires 5 and perpendicular to the piano of the drawing, wherein the alignment of the second clamping jaw 17 remains parallel to the alignment of the first clamping jaw 16. This means that the wire area held by the second clamping jaw 17 continues to be parallel to the area of the wires 5 held in clamping jaw 16.

This Z-angling ultimately defines the groove jump which the respective wire 5 overcomes when the wire exits out of the first groove of the stator in the installed state, and then dips back into a second groove at a specific distance removed from this first groove.

Figure 24:
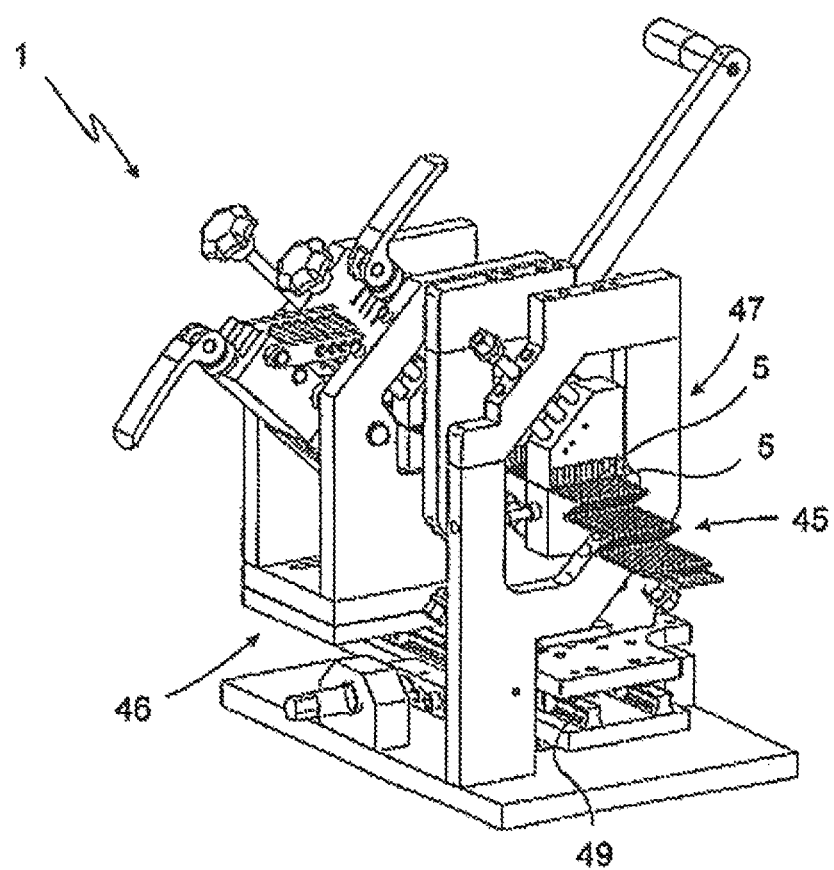
FIG. 24 is another variant of the twisting machine according to the invention in a three-dimensional view.

In FIG. 24, another variant of the twisting machine 1 according to the invention is shown. The twisting machine 1 shown here is designed as a device to be operated manually, but the same principle can also be implemented in an automated machine with corresponding controls. The twisting machine 1 shown here for one thing comprises the twisting station 46 which is used for twisting the wires 5 (see FIGS. 5A to 5F). Also, the twisting machine 1 comprises an angling station 47 for impressing the Z-angling provided after the twisting station 46 in the feed direction 100 of the wire 5.

Figure 25A:
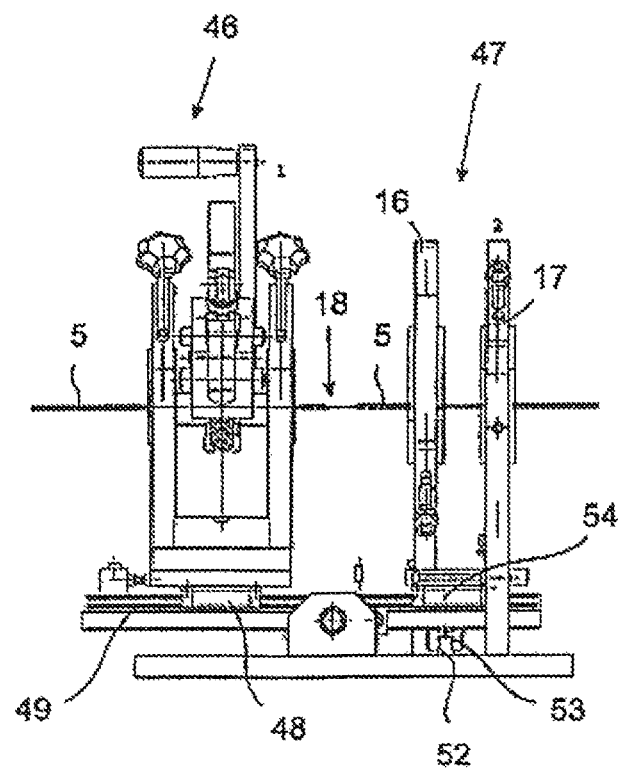
FIG. 25 consists of FIGS. 25A and 25B showing different positions of the twisting machine according to FIG. 24, each in one view.
Figure 25B:
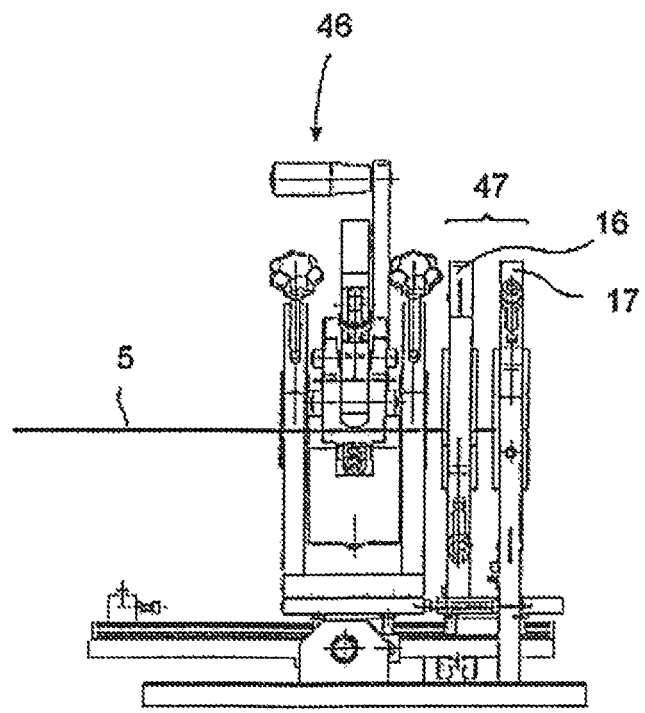

FIGS. 25A and 25B show different positions of the twisting machine according to FIG. 24, each in one view, In FIG. 25A, it can easily be seen that the twisting station 46 is mounted movably (manually or motor-driven) on a guide track 49 by way of sled 48. The mobility resulting from this is essentially parallel to the longitudinal extent of the wire 5 and thereby in the feed direction 100. Mobile clamping jaw 16 of angling station 47 also sits on this guide track 49, for which sled 54 is provided.

In addition to the mobile clamping jaw 16, the angling station 47 also comprises a fixed clamping jaw 17, wherein the mobile clamping jaw 16 is located between the fixed clamping jaw 17 and the twisting station 46.

Strictly speaking, a crossing table guide is provided. The mobile, first clamping jaw 16 and she twisting station 46 are mounted on sled 53 by way of guide track 49, the sled being movable and positionable on a guide track 52, wherein the longitudinal extent of guide track 52 is perpendicular to the longitudinal extent of guide track 49. Fixed clamping jaw 17 is positionally fixed relative to this crossing table guide.

In the twisting station 46, the wires 5 remain clamped after twisting. Now, the twisting station 46 is moved in the direction of the fixed clamping jaw 17 up to the point of contact, wherein the fixed clamping jaw 17 is not clamping the wires 5 during this time, in other words is open. Then, the fixed clamping jaw 17 is clamped, the twisting station is opened (releasing the wires 5) and pushed back to the initial position according to FIG. 25A. The mobile clamping jaw 16 is opened.

Figure 26A:
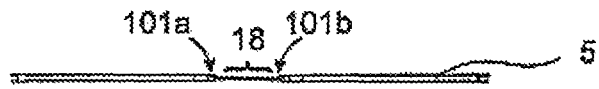
FIG. 26 consists of FIGS. 26A, 26B and 26C.
Figure 26B:
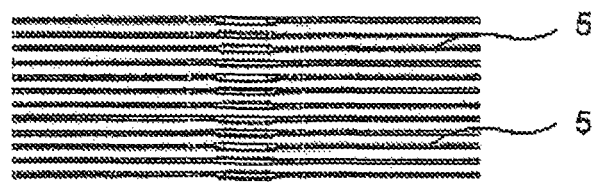
Figure 26C:
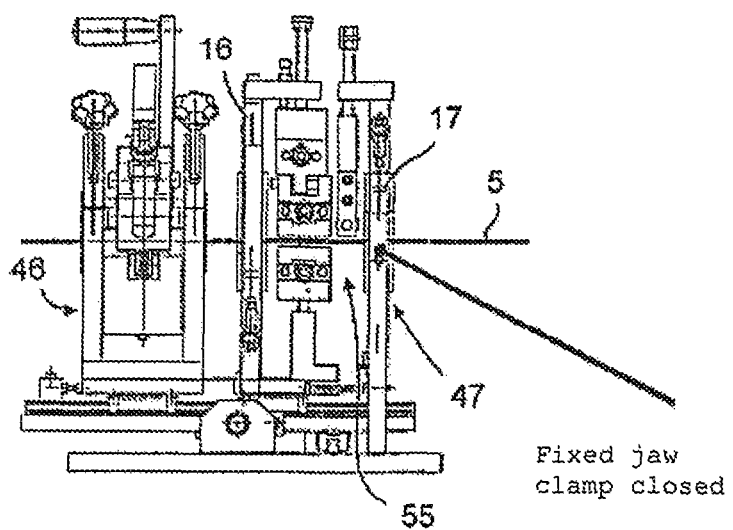
Figure 27A:
FIG. 27 consists of FIGS. 27A, 27B and 27C.
Figure 27B:
Figure 27C:
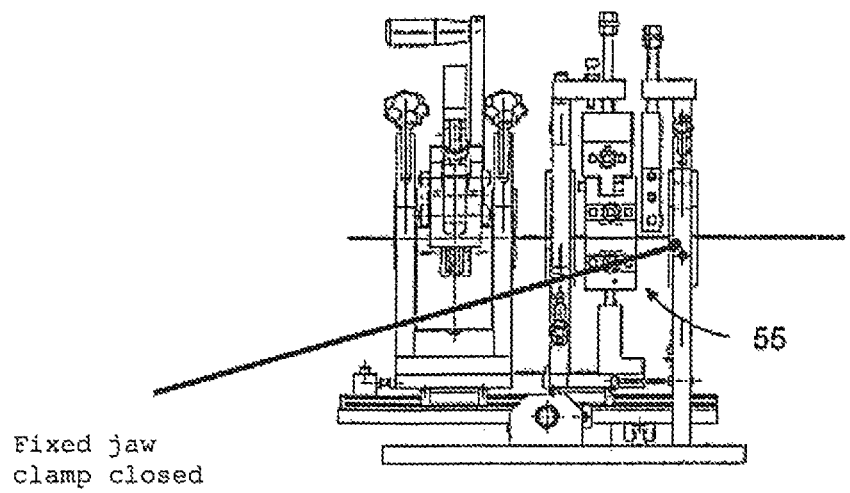

FIG. 26C shows another advantageous embodiment of the twisting machine 1. The exchange station 55 is located between the fixed jaw 17 and the mobile jaw 16. The task of the exchange station 55 is to cross or exchange the sequence and/or positions of the wires 5 in pairs in a targeted manner. The figure sequence according to FIGS. 26, 27, 29, 31, and 33 shows this position exchange process. Here, the exchange station 55 comprises an upper wire clamp 56 and a lower wire clamp 57 as can be seen in particular in FIG. 28, which shows a view in the direction of view of the wires 5. What is important to note is that the exchange station 55 is only used between the fixed clamping jaw 17 and the mobile clamping jaw 16 as needed (manually) or in an automated machine is placed at wires 5 for a limited time period.

In the figure sequence according to FIGS. 26, 27, 29, 31, 33, the figures show various views, wherein the figures with the letter "C" represent the twisting machine according to FIG. 24, the figures with the letter "B" represent the twelve parallel wires in a top view and the FIGS. with the letter "A" represent the twelve parallel wires in a side view.

In FIG. 26A, the two twisting sections 101a and 101b are marked in which the lateral edges of the flat wire 5 follow along a helical line at an angular bend of 90°. The twisted area 18 is located between the two twisting sections 101a and 101b.

Figure 28:
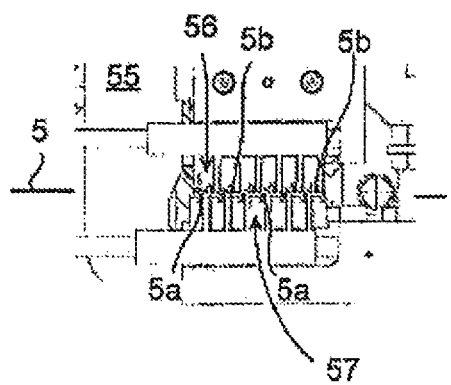
FIG. 28 is a view of a detail according to FIGS. 26C and 27C.

The different wires 5a and 5b are clearly shown in FIG. 28. By bringing the upper and lower wire clamps 56, 57 together, the first, third, fifth, seventh, ninth and eleventh wire 5a are bent downward, and the second, fourth, sixth, eighth, tenth and twelfth wire 5b are bent upward. The result of this process can be seen in FIG. 27A, where the wires 5 initially located in one plane on the right are now split into two partial planes for wires 5a and 5b. After this deflection or bending has taken place, the wires 5 are clamped in the wire clamp 56, 57. It should be noted that the fixed jaw 17 is closed here, in other words wires 5 are clamped here.

Figure 29A:
FIG. 29 consists of FIGS. 29A, 29B and 29C.
Figure 29B:
Figure 29C:
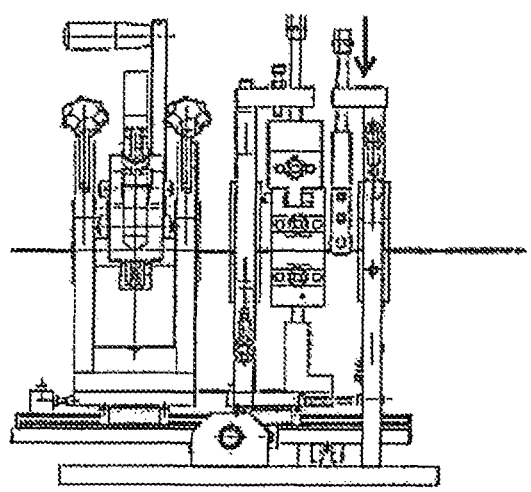
Figure 30:
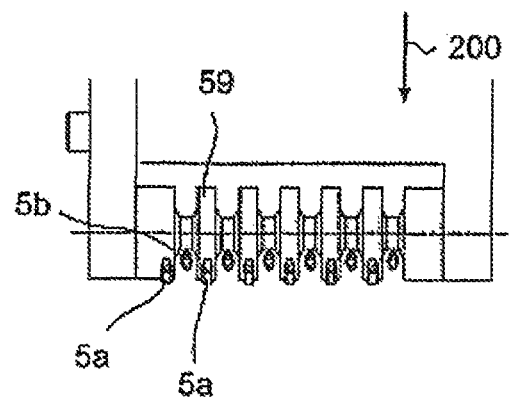
FIG. 30 is a view of a detail according to FIG. 29C.

In FIGS. 29A, 29B and 29C, the next step is shown. A rounding is formed in the lower wires 5a (from left to right the first, third, fifth, seventh, ninth and eleventh wire 5a of the initially twelve parallel wires 5) are by pressing in the perpendicular direction (see arrow 200) relative to the longitudinal extension of the wires 5 using a roll 59 (see FIG. 30). This provides a way to deviate these wires or wire supply after the paired exchange of the wires prior to the Z-angling. The roll 59 comprises a plurality of discs of different diameter which are mounted alternatingly on a common shaft. Each disc is assigned to one wire 5, wherein the discs with the larger diameter are provided for the imprinting of the rounding 58, whereas the discs with the smaller diameter do not shape the wire 5, but rather only guide the same.

Figure 32A:
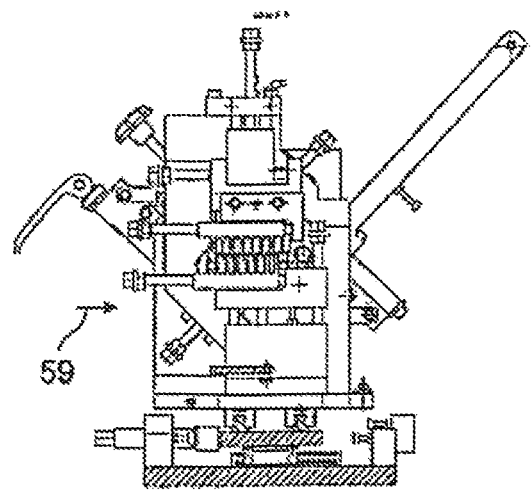
FIG. 32 consists of FIGS. 32A and 32B showing respective views of a detail according to FIG. 31C.
Figure 32B:
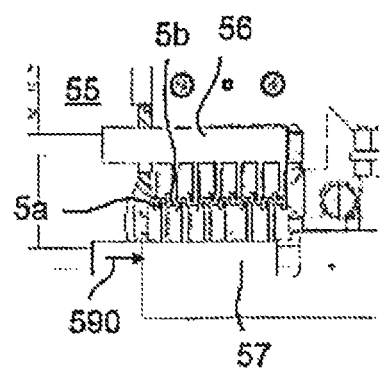

The paired conductor exchange is described best in FIG. 32B, which is a detail view of the view according to FIG. 32A. FIG. 32B shows the exchange station 55 in which the upper wire clamp 56 and the lower wire clamp 57 hold the wires 5a, 5b fixed in upper and lower planes. Now, the lower wire clamp 57 is moved along arrow 590 relative to the upper wire clamp 56, where the direction of arrow 590 to the right is essentially perpendicular to the longitudinal extent of wires 5a, 5b. The shift in the direction of arrow 590 is equal to exactly twice the distance between wires 5 in the initial parallel arrangement thereof, resulting in a conductor exchange.

Figure 31A:
FIG. 31 consists of FIGS. 31A, 31B and 31C.
Figure 31B:
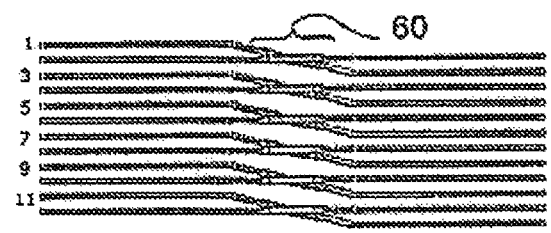
Figure 31C:
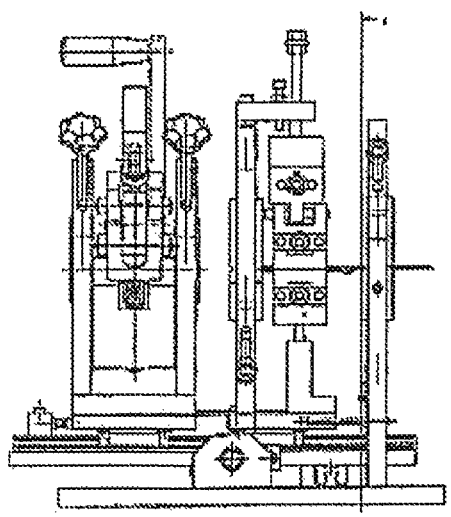

The result of this shift can be seen in FIG. 31B, where a crossing of adjacent wires 5a and 5b is now performed in the twisting or twisted area 18. This crossing area is identified by the reference sign 60. Here, the first and the second wires cross one another, as do the third and the forth wires, the fifth and the sixth wires, the seventh and the eighth wires, the ninth and tenth wires and the eleventh and twelfth wires. The numbering of individual wires 5 is indicated to the left in FIG. 31B.

Figure 33A:
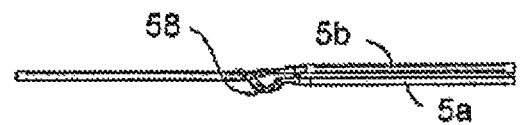
FIG. 33 consists of FIGS. 33A, 33B and 33C showing the manufacturing process for the wire winding according to the invention in various positions (FIGS. 26, 27, 29, 31, 33) and in various views, wherein the figures with the letter "C" represent the twisting machine according to FIG. 24, the figures with the letter "B" represent the parallel wires in a top view and the figures with the letter "A" represent the parallel wires in a side view.
Figure 33B:
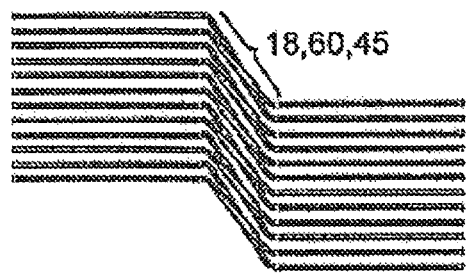
Figure 33C:
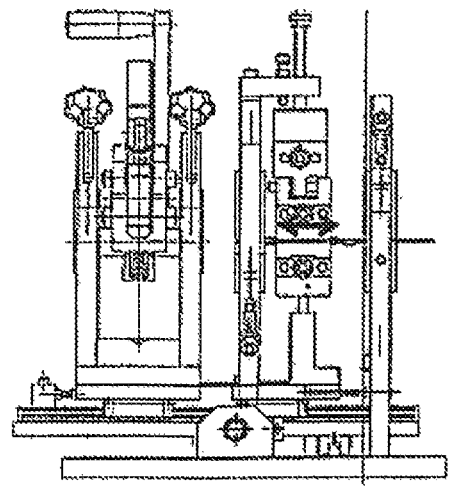
Figure 34A:
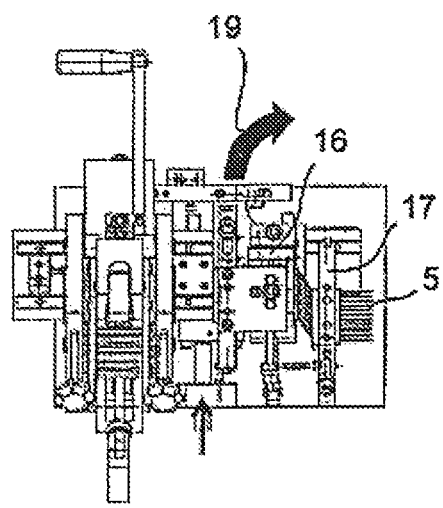
FIG. 34 consists of FIGS. 34A and 34B showing respective details according to FIG. 33C in a top view.
Figure 34B:
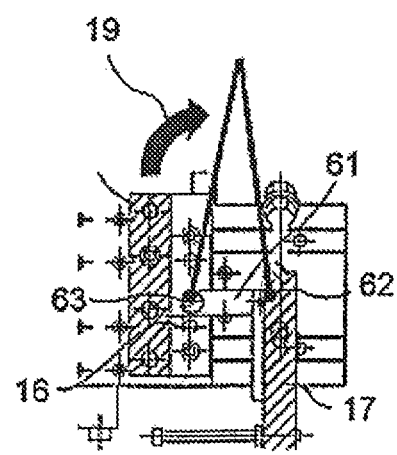

In the twisted area 18 which is also simultaneously the crossing area 60, the Z-angling 45 is incorporated as well, as is shown in FIG. 33B, for example. This is achieved by tilting the mobile clamping jaw 16 clockwise together with the twisting station 46 in a circular tilting motion 19, which is easily made possible by the crossing sled guide (see FIG. 25A). To actually achieve a circular tilting motion 19, a movably mounted turning means 61 is provided between, the fixed clamping jaw 17 and the mobile clamping jaw 16, the turning means being supported in respective pivot points 62 (in the fixed clamping jaw 17) and 63 (in the mobile clamping jaw 16), see FIG. 34B.

At first glance, it appears complicated to make a large proportion of the twisting machine 1 tiltably mounted. However, this provides the advantage that the parallel wires 5 on the right always leave the twisting machine 1 at the same position at the end of the twisting machine 1 (see FIG. 35A, for example) after the angling station 47, which makes the following winding of this wire package onto sword 24 (see FIG. 7 left, large partial, figure for example) considerably easier.

Since wires 5a and 5b are now being guided in different planes, the pivot points thereof are not at the same point for forming the Z-angling. A comparison of the design of the rounding 58 according to FIG. 33A and the rounding 58 according to FIG. 31A, a certain change results, namely that the rounding 58 according to FIG. 33A is greater, i.e. is more bulged; in this rounding 58, compensation is provided for the length difference resulting from the interlacing (and the buckling of the bottom wire 5a associated therewith).

Figure 35A:
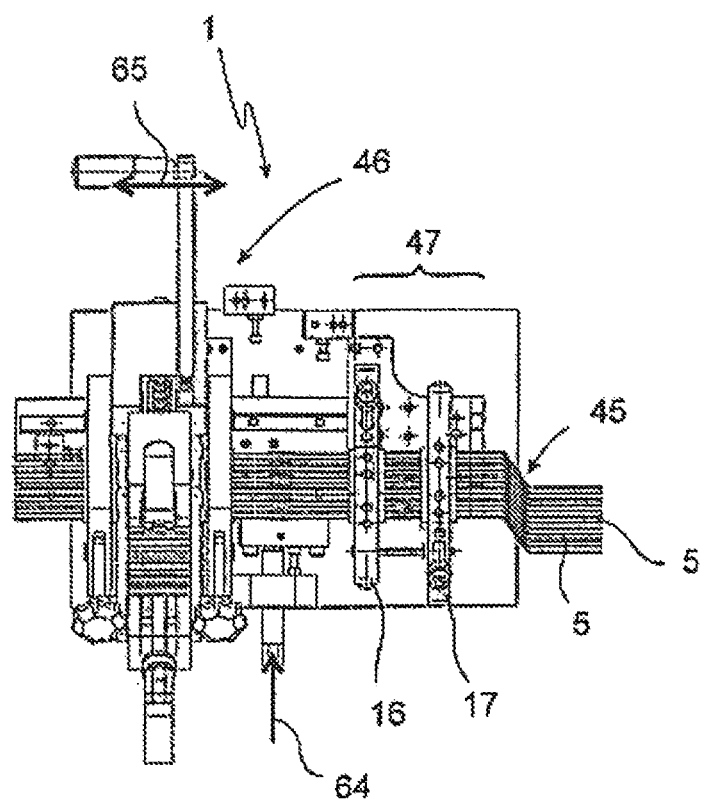
FIG. 35 consists of FIGS. 35A and 35B showing the manufacturing process of the wire winding (here the Z-angling according to FIGS. 6A and 6B) according to the invention in different positions.
Figure 35B:
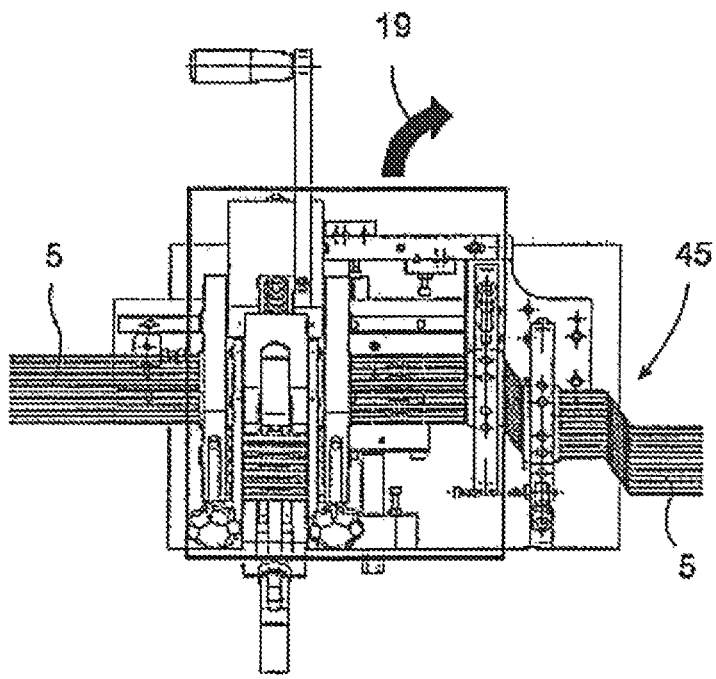

FIG. 35A shows the twisting machine 1 according to the invention again, without the exchange station 55. One advantage of the proposal is that the twisting machine 1 can be supplemented by the exchange station 55 as needed in order to facilitate the wire exchange process as needed. However, this is seldom required, which is why in most Z-anglings to be made the exchange station 55 is not always required. The fixed clamping jaw 17 is disposed at the frame positionally-fixed, and the other part of the twisting machine 1, namely the twisting station 46 and the mobile first clamping jaw 16, is movable relative to the frame at the crossing table arrangement, the mobility being indicated by the two perpendicular arrows 64 and 65 which, when they are skillfully overlapped and guided by a turning means, for example, result in the tilting motion 19 (see FIG. 35B).

The invention also involves a device for carrying out this method.

Figure 36A:
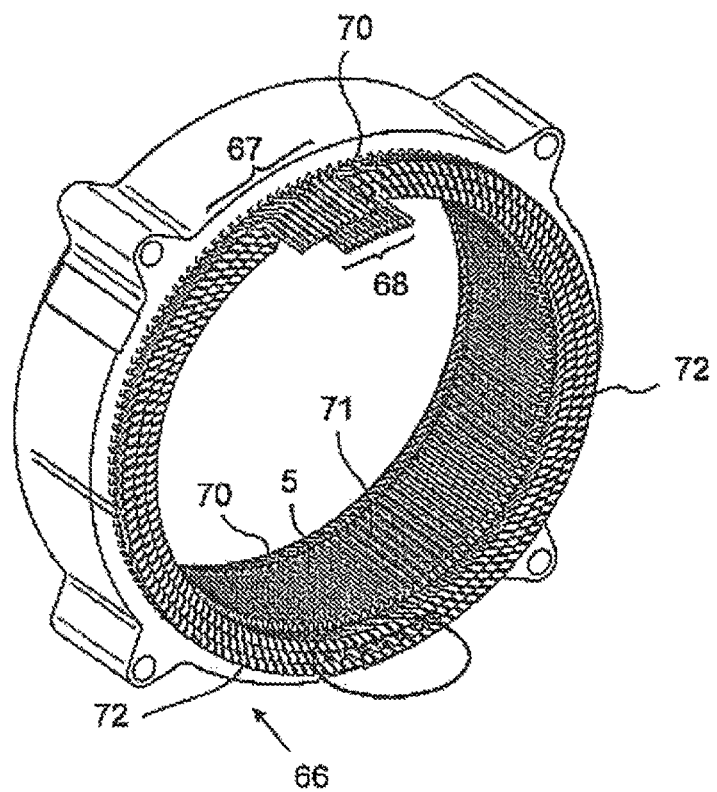
FIG. 36 consists of FIGS. 36A, 36B and 36C showing the stator according to the invention in a three-dimensional view (FIG. 36A) and details thereof in FIGS. 36B and 36C.

In FIG. 36A, stator 66 of an electrical machine according to the invention is shown schematically. The annular stator 66 is equipped with a plurality of (inner) grooves 70 into which the wires 5 are placed in multiple layers one atop the other. The wires 5 are installed here as wire windings, wherein the wire windings consist of bars 71 which are placed into the grooves 70 and which make a jump to the next groove 70 by way of a pitched angling 72 at the axial ends of the bars. In the process, the wire winding comprises two connection areas 67, 68 which facilitate a corresponding connection.

The wire winding here comprises twelve parallel wires 5, resulting in the connection areas 67, 68 each having twelve wire ends. The wire winding in its entirety is placed in the stator 66 in three rows, resulting in six bars 71 each being disposed in one groove 70.

Figure 36B:
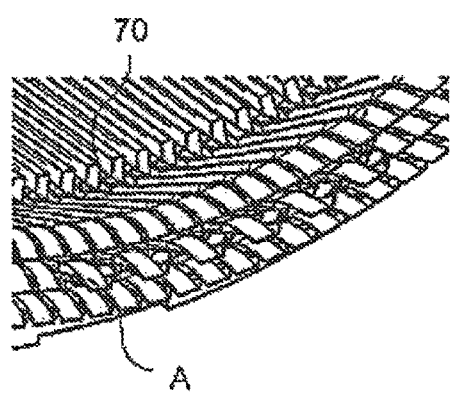
Figure 36C:
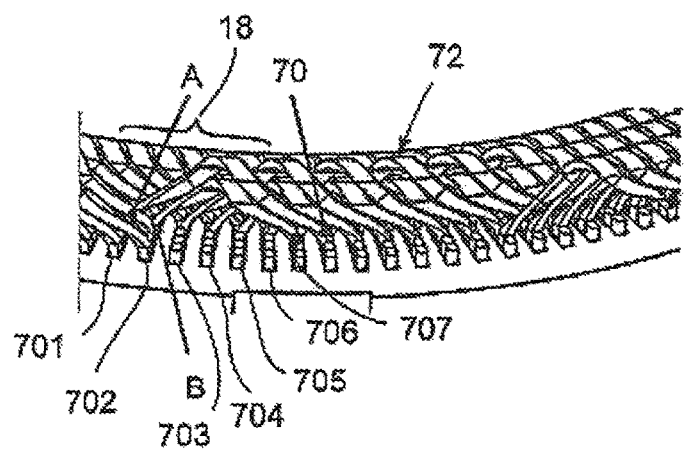
Figure 37A:
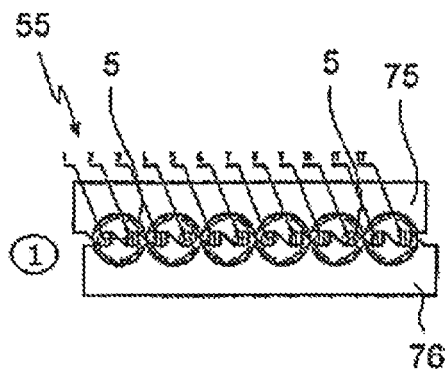
FIG. 37 consists of FIGS. 37A, 37B, 37C and 37D showing in one view a figure sequence of the different positions of the exchange station according to the invention.
Figure 37B:
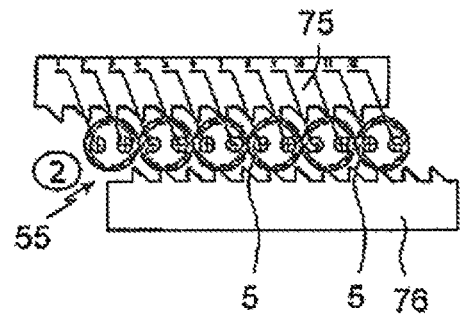
Figure 37C:
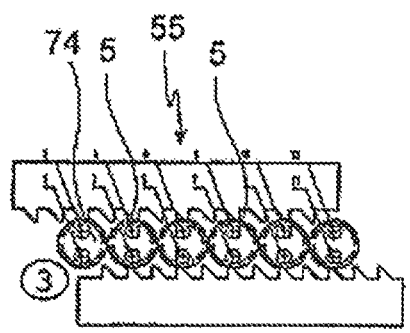
Figure 37D:
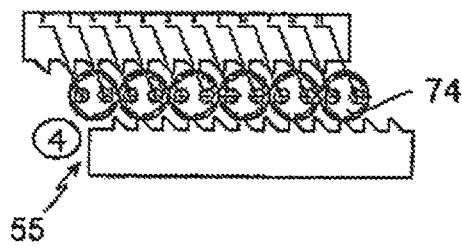
Figure 38:
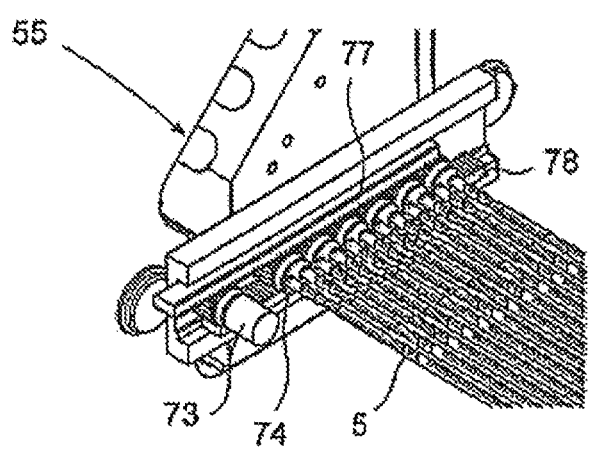
FIG. 38 is the exchange station according to the invention in a three-dimensional view.

The normal (overwhelmingly) wire arrangement (see FIGS. 36B and 36C, which is an enlargement of the elliptical area according to FIG. 36A) is such that the first wire A exits the first groove 701 from a first radial layer, then (as all other wires) forms a pitched angling 72 in order to then dip back down into groove 707 six grooves later in a second radially layer, wherein the second radial layer has a smaller diameter than the first radial layer. Located in the area of the pitched angling 72 is the respective twisted area 18 of the respective wire 5, the area extending across the entire top area of the pitched angling 72 in particular (or only parts thereof) but not touching the bar in the groove. The second wire B (and all other wires of the twelve) are similarly constructed.

To improve the efficiency of an electrical machine so constructed, it has already been found that a one-time paired wire exchange or wire switching should be provided in the stator centrally, i.e. approximately at half the wire winding. It is known from the prior art in this regard that the wires should be cut and then re-connected after being re-sorted, for example by way of welding. Such a process is obviously complicated and prone to error, and thus requires an additional insulation step:

However, in a skillful manner, this wire crossing step or wire exchange can be incorporated into a skillful wire winding production process itself, for which the method steps described above are intended and which lead to a special type of stator 66 for implementing this exchange of lines which does not require the cutting of the wires.

In the paired wire exchange to be provided centrally, wire A, for example, in turn exits groove 701 but does not then dip back down into groove 707 as usual, but into groove 708 which had been occupied by the second wire B up to that point. Wire B exits groove 702 and then dips back down into groove 707. The dipping process here is into a different, second radial layer than the exiting process occurring in the first radial layer under the condition that the second radial layer has a smaller diameter than the first radial layer.

The result is that the crossing area 60 is also contained in the twisted area 18, wherein wire A almost completely hides wire 8 in the axial view.

To improve the electrical properties, a single or also a double wire exchange area, paired in each case, is provided for all twelve wires per stator 66. In particular, the wire exchange area(s) is/are located at the side of the stator opposite to the connection area 67, 68. In particular, the wire exchange area is also located in the middle area of the layers of the wire winding, for example in the third and fourth layer of a total of six layers. In this example with two wire exchange areas, wire exchange areas are located therebetween which have conventional, normal wire arrangements as described above.

A layer is understood to be the radial position of a wire or bar 71 in groove 70.

However, the invention is not limited to the embodiment described above. Many such wire exchange areas can be provided per stator. These areas can be exchanged with the conventional, normal wire arrangements described above.

The figure sequence 37A, 37B, 37C, and 37D shows an alternative embodiment of an exchange station 55. The variant of the exchange station 55 shown here comprises a number of wire receptacles 74, in particular linear here, disposed next to one another, the receptacles holding and guiding the wires 5 in respective pairs. It should be noted that the arrangement of wire receptacles 74 can be widely varied according to the invention, i.e. not limited to the straight, linear arrangement shown here. Conceivable arrangements include those with multiple rows or circular arrangements. The wire receptacles 54 are able to pivot about an axis of rotation which is essentially parallel to the longitudinal extent of the wires being guided in the wire receptacles 54. A total of six wire receptacles 54 are shown, each of which hold two wires 5, but the number of wires guided per wire receptacle is not limited according to the invention. It is also conceivable that the exchange stations described are multiply disposed one after the other in the feed direction, thus making possible any number of wire jumps.

The twelve wires shown here are numbered from 1-12 individually with Arabic numerals. This numbering makes it very clear how the sequence of wires changes among themselves by the use of the proposed exchange station (see the figure sequence 37A, 37B, 37C and 37D).

Also, the exchange station 55 comprises two clamping jaws 75, 76 which can be moved toward one another, the jaws having a sawtooth structure and thus fixing the wires 5 therebetween in the clamped situation (see FIG. 37, closed, for example, in FIG. 37 opened).

The exchange station 55 exchanges the wires in pairs, so the exchange station 55 comprises six wire receptacles 74, each of which can hold a pair of wires. The wire receptacles 74 of the exchange station 55 each have a cylindrical shape with an exterior tooth structure and are located between two tooth racks 77 and 78 which can be moved relative to one another by way of a common central drive unit 73, thereby facilitating a rotating motion of the individual wire receptacles 74 (see FIGS. 39A, 39B and 39C, for example), which enables the exchange motion.

The movement of the wire receptacles 54 of the exchange station 55 is preferred to occur synchronously and is described by the following table with reference to the figure sequence 37A, 37B, 37C, 37D and figure sequence 39A, 33B and 39C. The respective positions are identified with the circled Arabic numerals 1-4.

|  | Exchange station | | |
| --- | --- | --- | --- |
| Position | Figure | Wires | Rotation |
| 1 | 37A, 39A | held | 0° |
| 2 | 37B, 39A | free | 0° |
| 3 | 37C, 39B | free | 90° |
| 4 | 37D, 39C | free | 180° |

In FIGS. 7A, 7B to FIG. 16C, a machine 21 for producing the shaft winding or wire mat is shown, each in a three-dimensional view and a detail view in various positions. This machine 21 produces a wire mat or a wire package from the Z-shaped bent wire arrangement as formed in FIG. 6B.

Figure 7A:
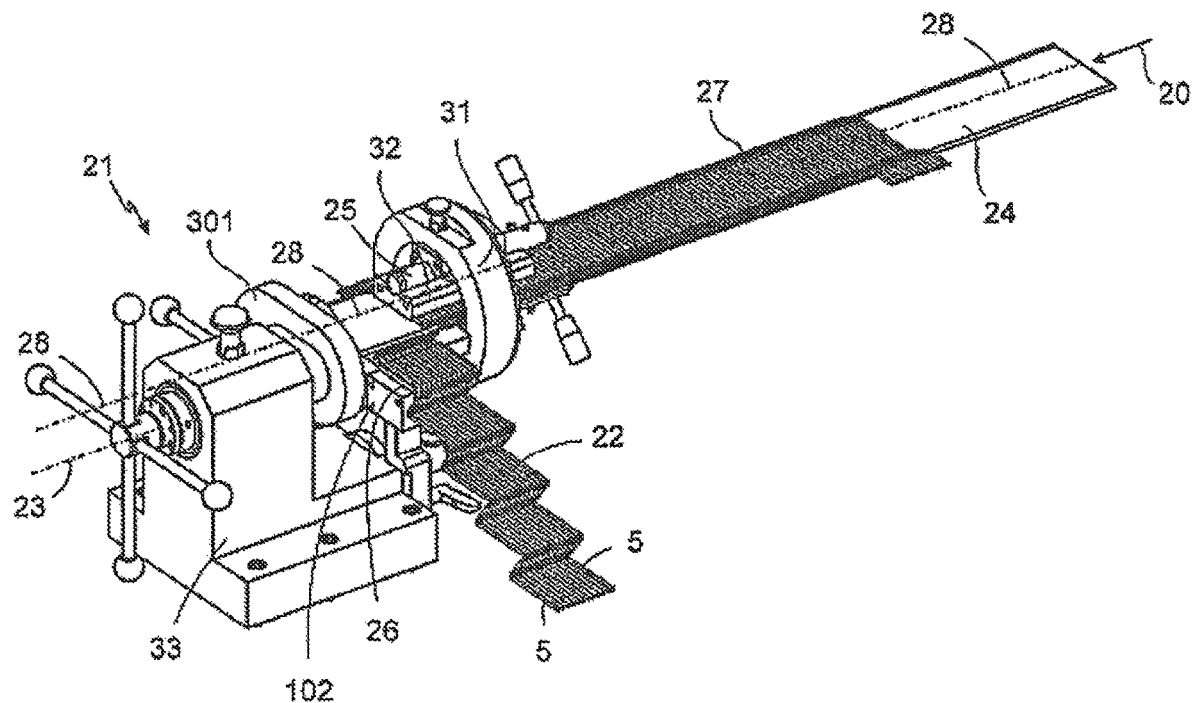
FIG. 7 consists of FIGS. 1A and 1B.
Figure 7B:
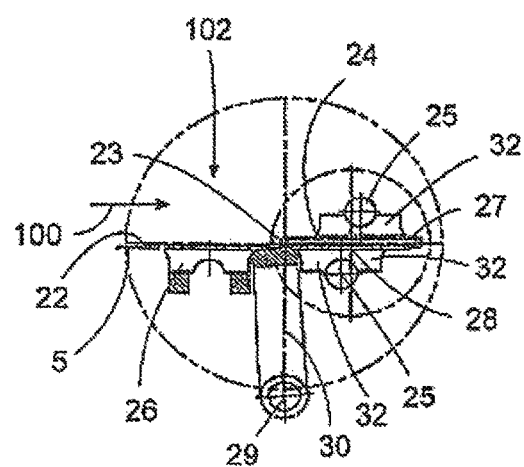

The principle construction of this machine 21 is described with the aid of FIGS. 7A and 7B. In this case, the machine is manually operated, but can also be implemented in the same manner with controllable drive units and using a machine control unit which controls the various motions. The function of this machine 21 is to produce a wire mat or wire package 27 from the wire arrangement 22 with Z-anglings, the mat or package able to be perceived as a wire arrangement 23 wound onto a sword-like support 24 along a helical line and made up of parallel wires 5. The support or sword 24 has a longitudinal sword axis 28. The sword 24 is surrounded by an annular support 31 which holds clamping jaws 32 scanted at guide rods 25. These clamping jaws 32 are provided an the bottom and top side of the sword 24 and press the wound wire package 27 against the sword 24. The annular support 31 is connected to the annular support mating part 301 by way of a bridge 300. The bridge 300 can be better seen in FIG. 11A or FIG. 12A; the bridge is hidden by the sword 24 in FIG. 7A.

The overall arrangement of sword 24 and annular support 31 is mounted also rotatably about a central rotating axis 23. The central rotating axis 23 and the sword axis 28 of the sword 24 run in parallel and offset from one another in the application example shown, for example horizontally. The overall arrangement consists of the sword 24, annular support 31 with clamping jaws 32 and guide rods 25, bridge 300 and annular support mating part 301, wherein the clamping jaws 32 can rotate together with the sword 24 relative to the annular support 31 about the sword rotational axis 28. The rotating mount is implemented in the annular support 31 and the annular support mating part 301.

In the feed direction 100 of the wire arrangement 22 before the sword 24, there is a pushing piece 30 on the bottom side of the wire arrangement 22, the piece being rotatable about a rotating axis 29 and adjustable relative to the wire arrangement 22 from below. The rotating axis 29 of the pressure piece 30 runs parallel to the sword rotating axis 28 and the central rotating axis 23. A connection line between the central rotating axis 23 and the rotating axis 28 of the pressure piece 30 includes a right angle to a connection line between the central rotating axis 23 and the sword rotating axis 28. This angle can in general also lie in a range between 70° and 110°, preferably between 80° and 100° within the scope of this disclosure.

In the entrance area 102, there is a temporary guide shoe 26 in front of the pressure piece 30.

The image sequence of FIGS. 7 to 16 shows various positions of this machine 21, wherein it is only the changes which are discussed below, the reference signs being the same.

FIGS. 7A and 7B (position 1) show the initial position as described above.

Figure 8A:
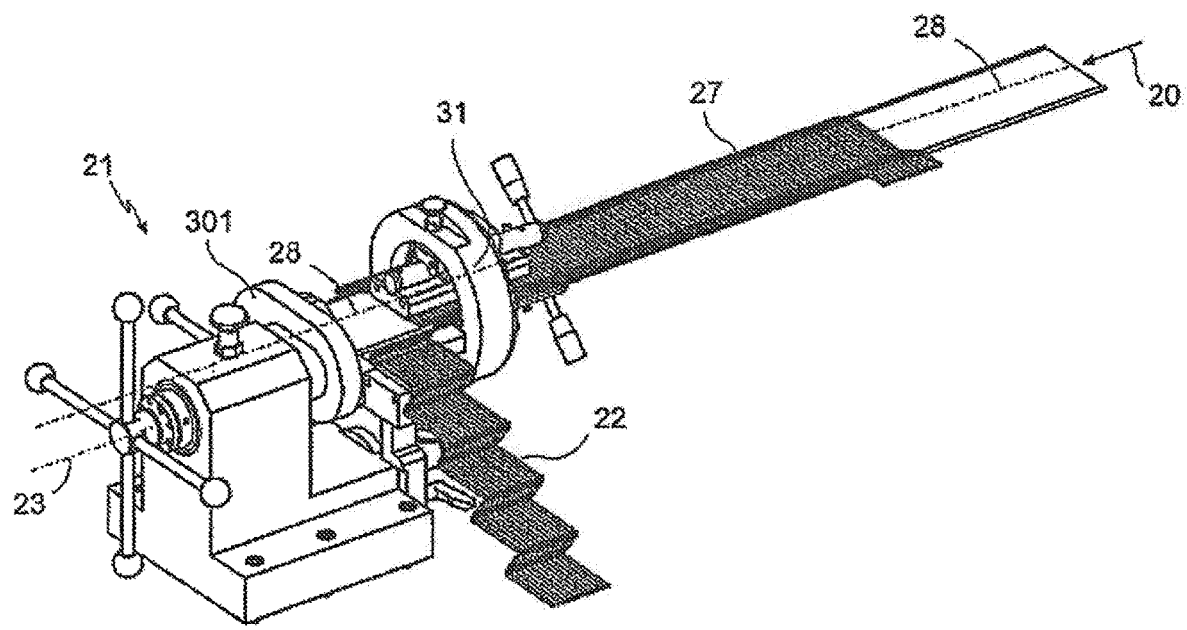
FIG. 8 consists of FIGS. 8A and 8B.
Figure 8B:
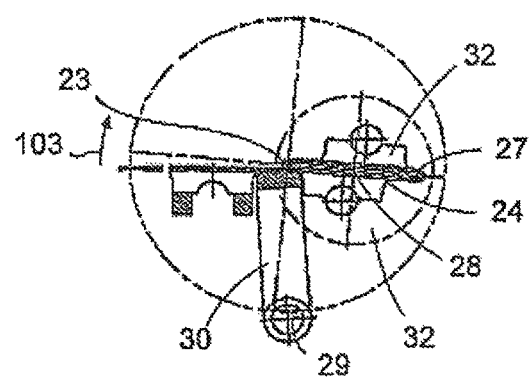

FIGS. 8A and 8B show position 2 in which the entire arrangement is bent about the central rotating axis 23 clockwise (arrow 103) in order to minimize spring-back in the wound wire mat 27. The clamping jaws 32 press the wire package 27 against the support 24. The rotating axis 29 of the pressure piece 30 and the position of the pressure piece 30 remain fixed in place unchanged during the rotation about the central rotating axis 23, which was not rotated. Here, the sword rotating axis 28 is locked, i.e. no relative motion takes place between the central rotating axis 23 and the sword rotating axis 28.

Figure 9A:
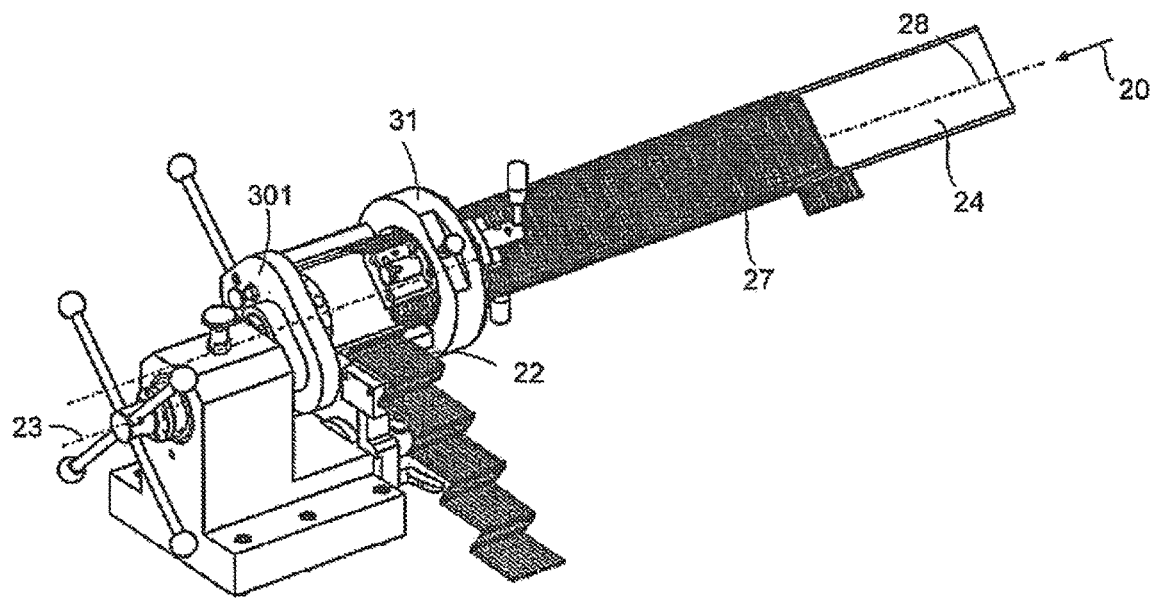
FIG. 9 consists of FIGS. 9A and 9B.
Figure 9B:
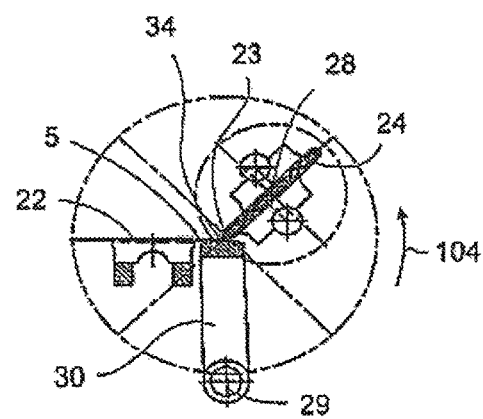

FIGS. 9A and 9B show position 3 in which the entire arrangement (except for the pressing piece 30 and the rotating axis 29 thereof) is rotated about the central rotating axis 23 counterclockwise by approximately 45° (arrow 104), the wire arrangement 22 is pulled onto the sword 24, in particular the wire 5 (12 wires running in parallel) being bent by the pressure piece 30 in cooperation with the lateral edge 34 of the support sword 24. In the process, the pressure piece 30, because of the hinged mounting thereof, is moved about the rotating axis 29, preventing damage to the wire. A roll-off motion results.

Figure 10A:
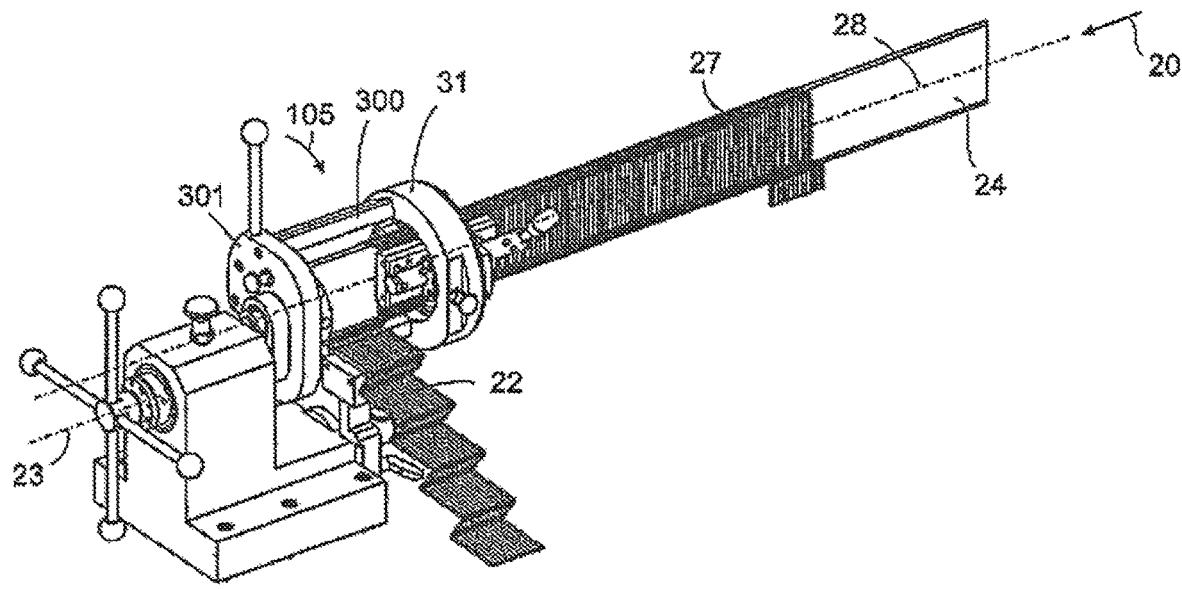
FIG. 10 consists of FIGS. 10A and 10B.
Figure 10B:
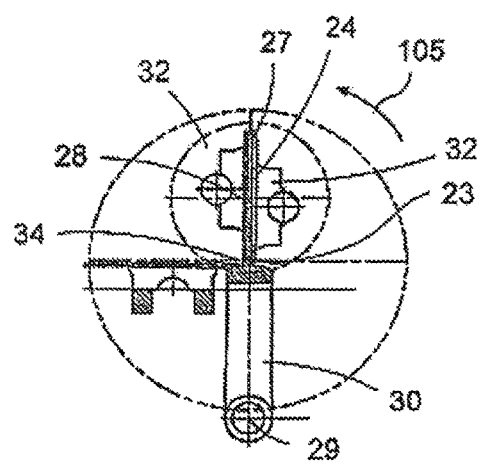

FIGS. 10A and 10B show position 4 in which the sword 24 is rotated about the central rotating axis 23 by 90° (arrow 105). As before, the clamping jaws 32 press the wire package 27 against the support 24.

Figure 11A:
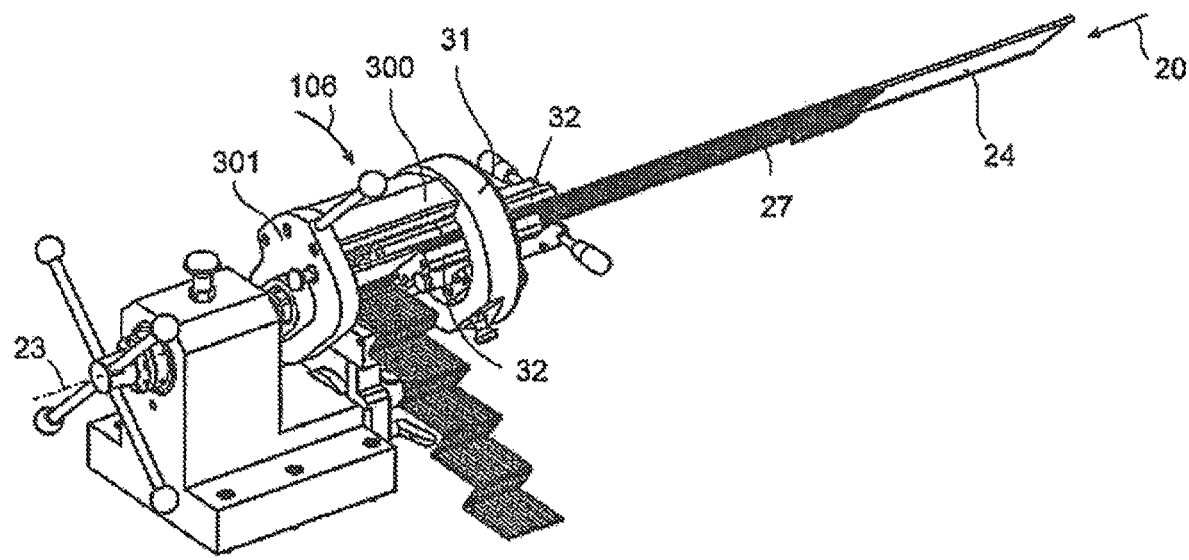
FIG. 11 consists of FIGS. 11A and 11B.
Figure 11B:
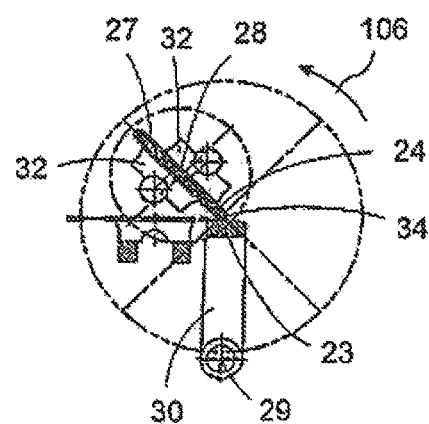

FIGS. 11A and 11B show position 5, in which the sword 24 is rotated to about 130° (arrow 106), with the lateral edge 34 of the sword 24 simultaneously rolling off of the pressure piece 30 and making a corresponding angling on the wire.

Figure 12A:
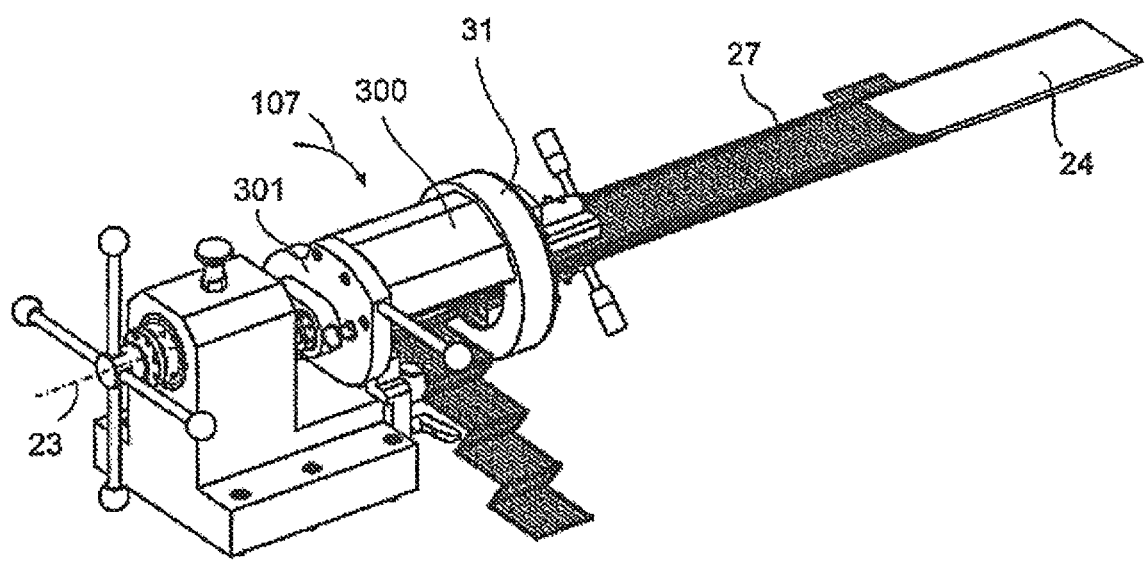
FIG. 12 consists of FIGS. 12A and 12B.
Figure 12B:
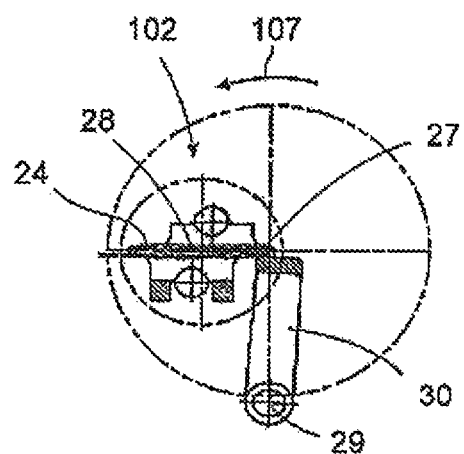

FIGS. 12A and 12B show position 6 in which the sword 24 has folded onto the incoming area 102 of the wire, i.e. has been rotated to 180° (see arrow 107).

Figure 13A:
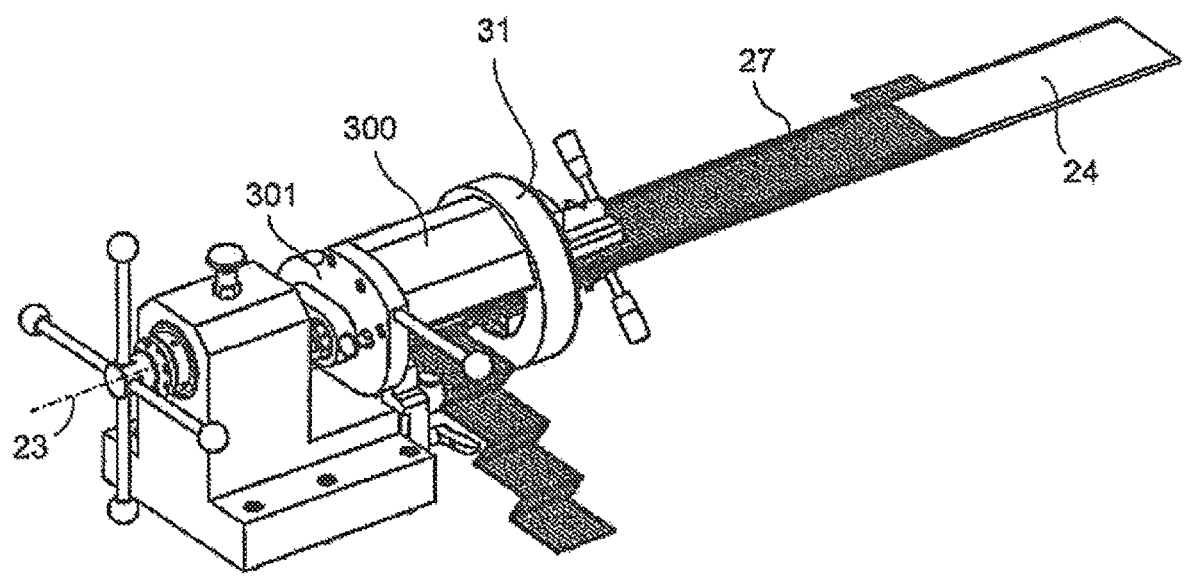
FIG. 13 consists of FIGS. 13A and 13B.
Figure 13B:
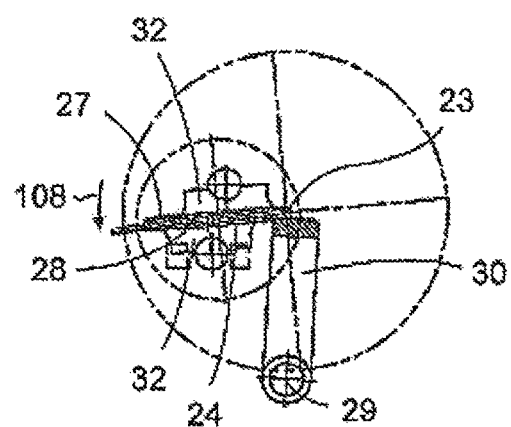

FIGS. 13A and 13B show position 7, in which an over-rotation (see arrow 108) of the sword 24 about the central rotating axis 23 has taken place in order to minimize spring-back.

To this end, the overall arrangement is rotated by 10°, 15° or 20° more in the counterclockwise direction (past the horizontal position according to FIGS. 12A and 12B). As before, the clamping jaws 32 press the wire package 27 against the support 24.

Figure 14A:
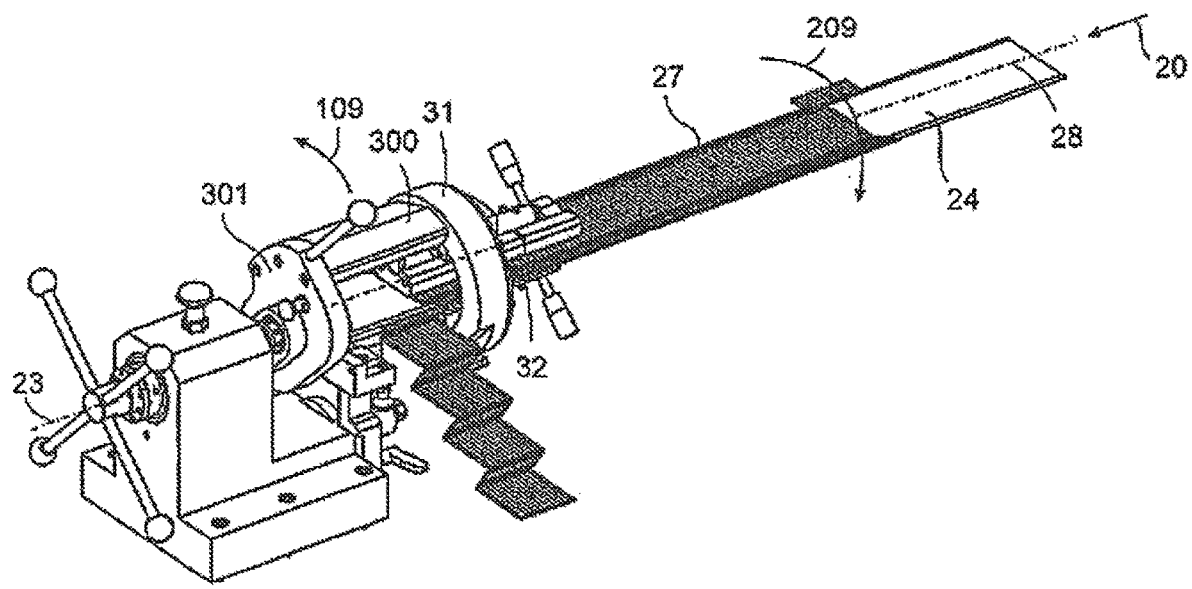
FIG. 14 consists of FIGS. 14A and 14B.
Figure 14B:
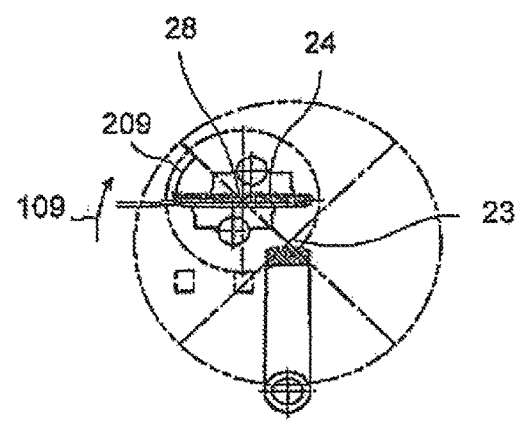

FIGS. 14A and 14B show position 8 in which the entire arrangement is on the one hand moved about the central axis 23 while a rotating movement of the sword 24 about the sword rotating axis 28 is performed at the same time in the opposite direction which compensates for the first movement, such that the sword 24 remains in the position assumed in FIG. 12. To this end it is provided that the entire arrangement is rotated back clockwise (arrow 109) and the sword 24 is rotated back about the sword rotating axis 28 counterclockwise (see arrow 209).

Figure 15A:
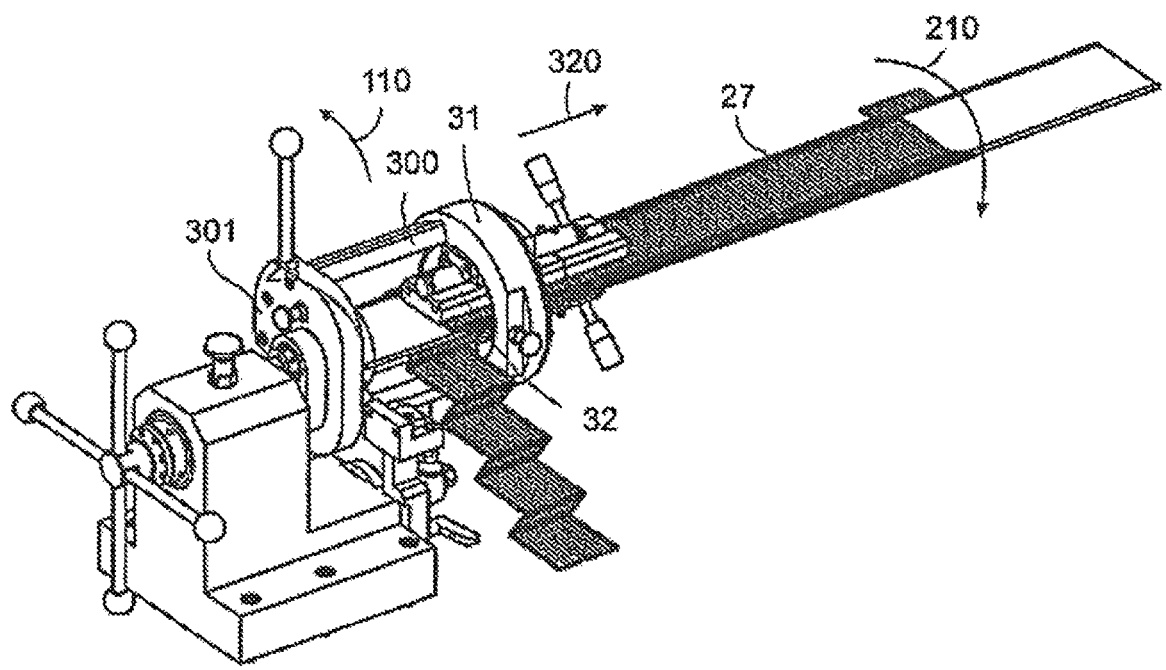
FIG. 15 consists of FIGS. 15A and 15B.
Figure 15B:
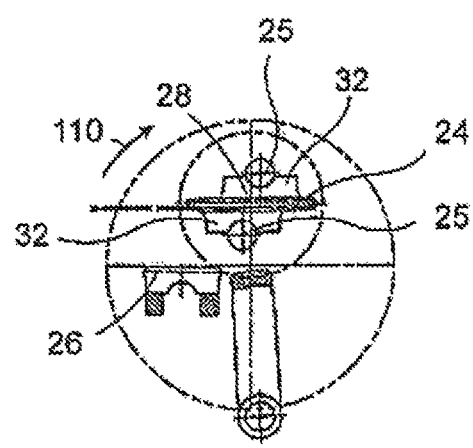

FIGS. 15A and 15B, position 9: the two opposing rotating motions (see arrows 110 and 210) again shown. Here, the wire is pulled onto the sword 24 and the machine 21 in a discontinuous step. Now, the temporary guide shoe 25 is prepared, because this simple wire winding, which is now completely wound onto the sword is further pushed onto the sword 24 by the clamping jaw 32. To this end, the clamping jaws 32 move longitudinally on the guide rods 25 (see arrow 320), and the longitudinal extension of the guide rods 25 is parallel to the sword rotating axis 28 of the sword 24. The temporary guide shoe 26 takes on stabilizing functions for a short time for the wire arrangement 22.

Figure 16A:
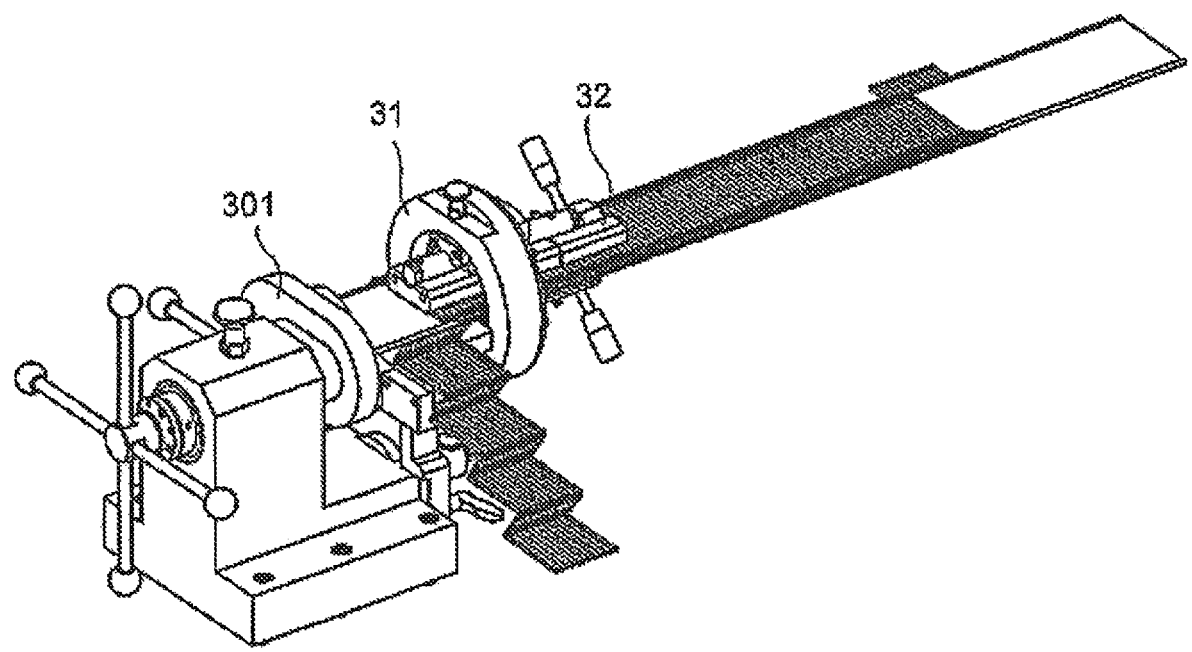
FIG. 16 consists of FIGS. 16A, 16B and 16C showing a machine for producing the shaft winding according to the indention, in different positions, each in a three-dimensional view (each with the figure letter "A") and each in a detail view (each with the figure letter "B") as seen in the direction of arrow 20 as seen in FIG. 7A.
Figure 16B:
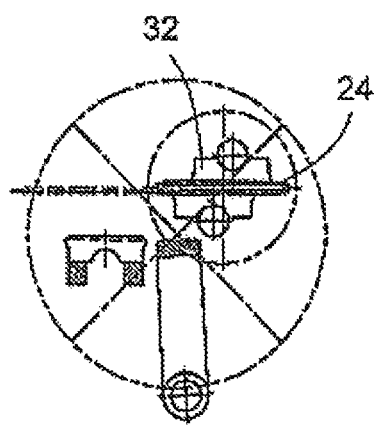
Figure 16C:
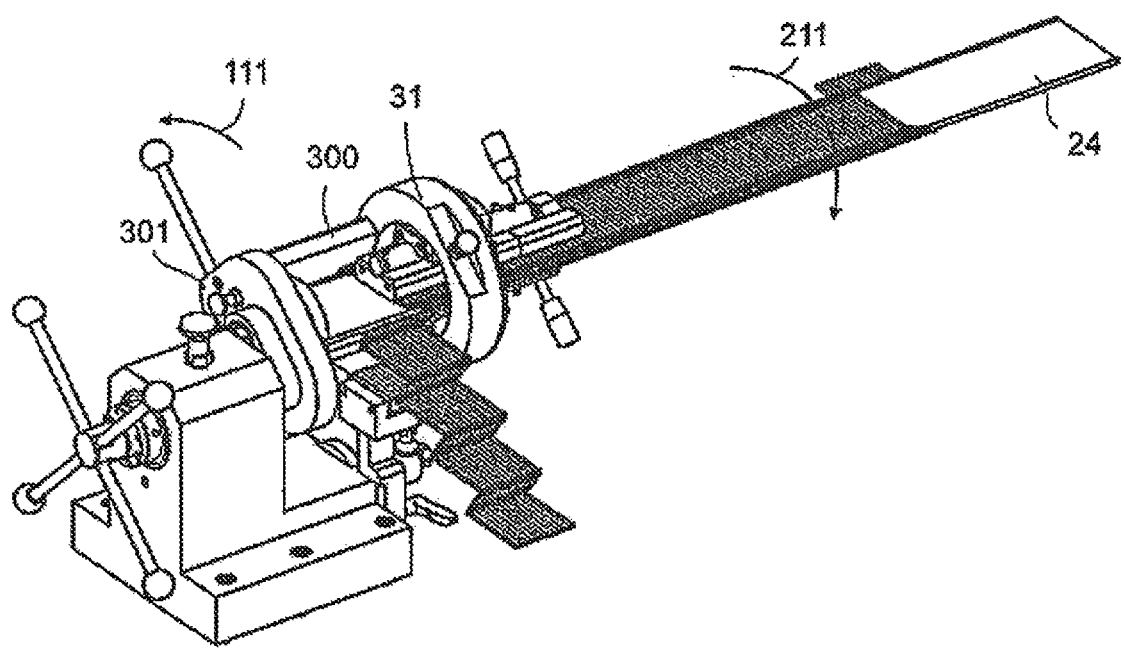

FIG. 16C shows another station (position 10) in the backward rotating motion of the overall arrangement (see arrow 111) with the oppositely directed rotational motion of the sword 24 (see arrow 211).

FIGS. 16A and 16B position 11: the sword 24 is almost back to the initial position according to FIG. 7, the wire mat 27 has become larger by one winding of the wire arrangement 22, and the wire mat has lengthened somewhat. The process begins again.

Figure 17:
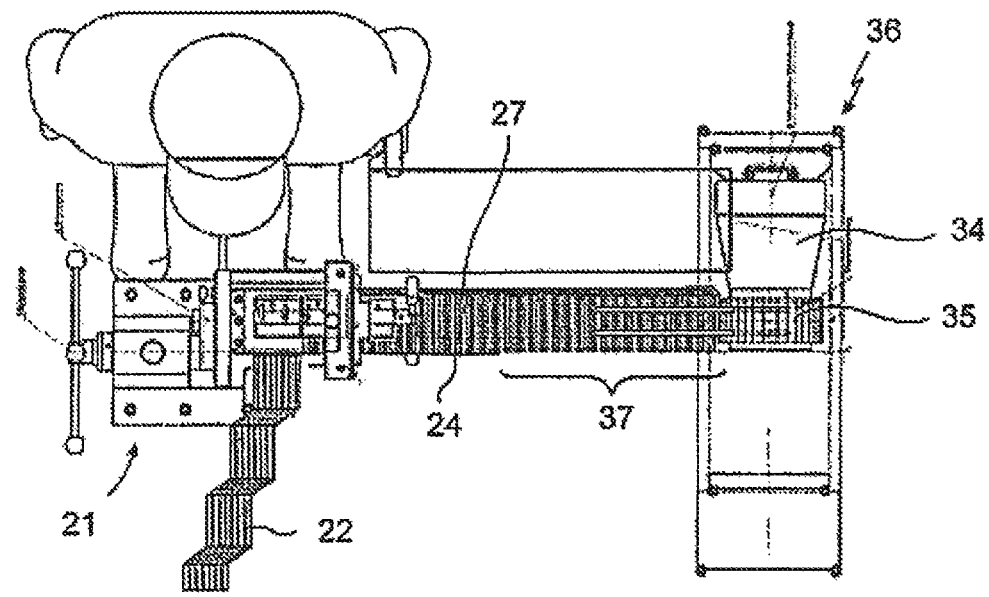
FIG. 17 is a combination of the machine for producing the shaft winding and a rolling machine in a top view.

FIG. 17 shows the combination with the machine 21 with a rolling machine 35. The function of the rolling machine 36 is to roll up the wire mat 27 which is sitting on the sword 24 onto a transfer tool 35. The rolling machine 36 is located in kinematic unity with the annular support 31, i.e. it makes exactly the same movements as the support and is therefore rotatable about the central rotating axis 23 and about the sword rotating axis 28 of the sword 24.

Between the end of the sword 24 and the transfer tool 35, the transfer length 37 is bridged by a transport tool 38 which is indicated in FIG. 13.

Figure 18:
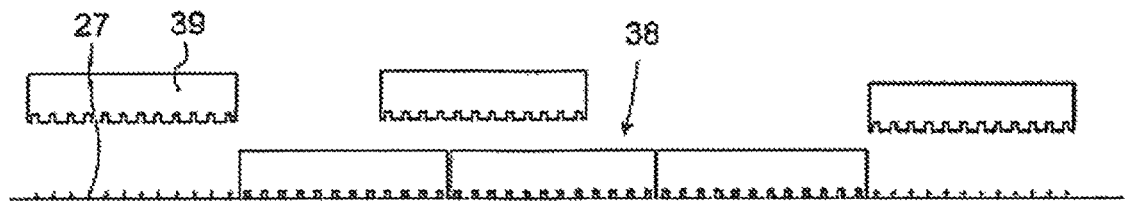
FIG. 18 is a detail according to FIG. 17.

In FIG. 18, a plurality of blocks or rake segments 39 are provided which are circulated on a belt, which is not shown, and which receive the wire mat 27. The tines of the segments 39 cooperate with the wire windings of the wire mat 27 in order to facilitate organized transport.

The wire mat 27 is rolled onto the transfer tool 35 using a drive unit 34.

Figure 19:
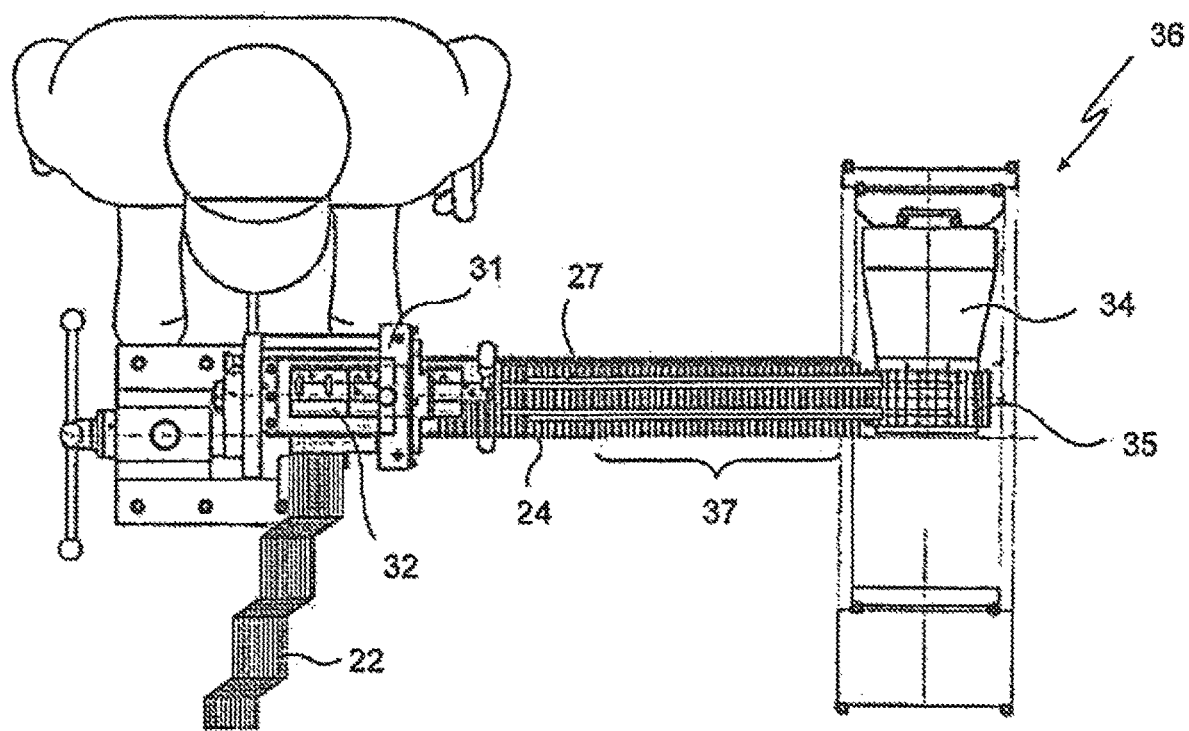
FIG. 19 is another combination of the machine for producing the shaft winding and a rolling machine according to the invention.
Figure 20:
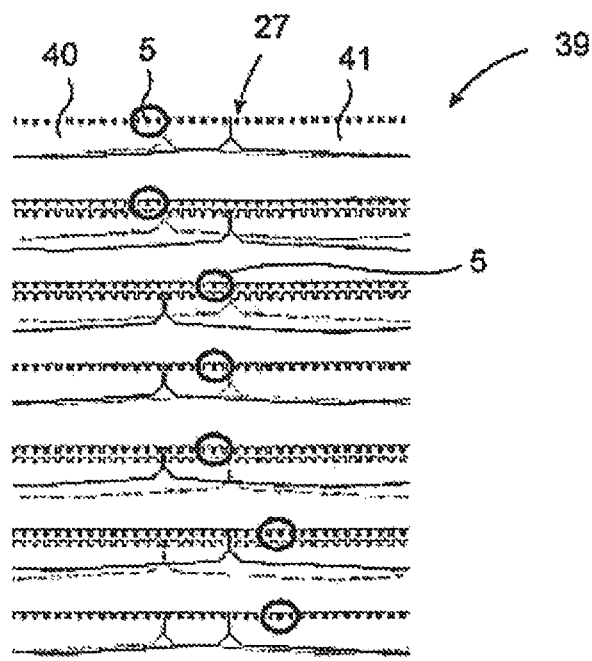
FIG. 20 is a detail according to FIG. 19.

In FIG. 19 and FIG. 20, an alternative embodiment to the variant according to FIG. 17 is shown. The transfer length 37 is bridged here by a transport tool 39 which comprises a plurality of rake elements 40, 41 one after the other, the tool moving the wire mat 27 by way of a lifting, transporting and lowering motion. The two rakes 40, 41 alternatingly execute a vertical motion and thereby convey the wire mat 27 (a single wire 5 is identified), in the direction of the transfer tool 35. See FIG. 20.

Figure 21:
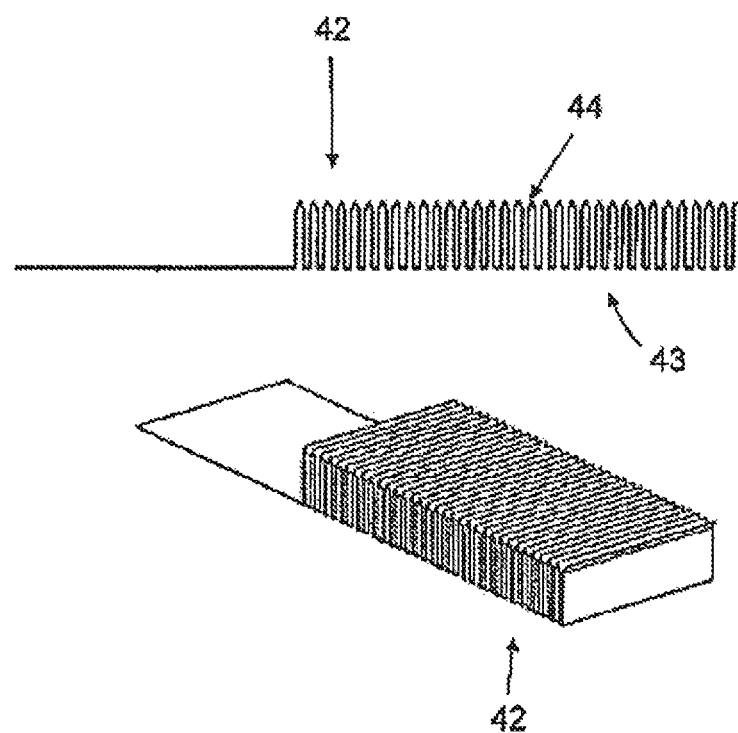
FIG. 21 is a special design of the insulating paper used according to the invention in a three-dimensional view and a lateral view above.

FIG. 21 shows an embodiment of a continuous insulating paper 42. The insulating paper represents an additional insulating layer between the wires 5 and the stator.

As seen in section (in FIG. 21 above the three-dimensional view), it can be seen that the stamping of the paper is not identical. On the bottom side, U-shaped elements are stamped in which in the installed position lie in the groove bases of the grooves of the stator. At the top side 44, triangular tips are formed at which the continuous paper is then cut in the installed position or previously.

Figure 22:
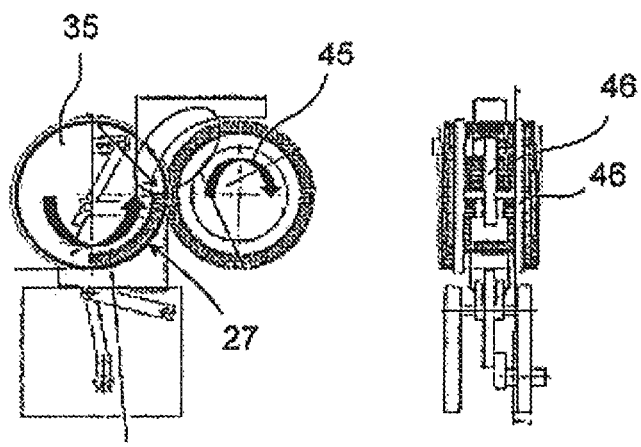
FIGS. 22 and 23 show transfer of the wire mat from the transfer tool to the pressing tool in two different variants, according to the invention.

FIG. 22 shows the transfer process or the wire mat 27 from the transfer tool 35 to a pressing tool 45, wherein this transfer motion is supported by rolls, for example, which make sure that the wire mats are positioned precisely on the pressing tool 45. The transfer tool 35 and the pressing tool 45 comprise a plurality of grooves or tines, respectively, at the peripheries thereof for exactly and reliably guiding the wire mats and matched to the groove separation of the stator.

The insulating paper 42 can now be pre-positioned either on the transfer tool 35 internally or externally relative to the wire mat (depending on how the transfer tool 35 is designed) or on the pressing tool 45, likewise inside or outside relative to the wire mat 27. It is also possible to cut the insulating paper 42 to length, which is continuous when inserted prior to installing the wire mat in the stator. "Continuous" here means continuous relative to the dimension/number of grooves of the stator.

When the wire mat 27 is installed in the stator, the insulating paper is located in the grooves of the stator between the wire mat and the stator, either as a continuous design or cut into segments.

The wire mat 27 is installed into the stator using the pressing tool 45. In this installed situation, the insulating paper is then located on the outside of the wire mat 27, if necessary already cut to length in this state, and positioned using suitable holders.

Figure 23:
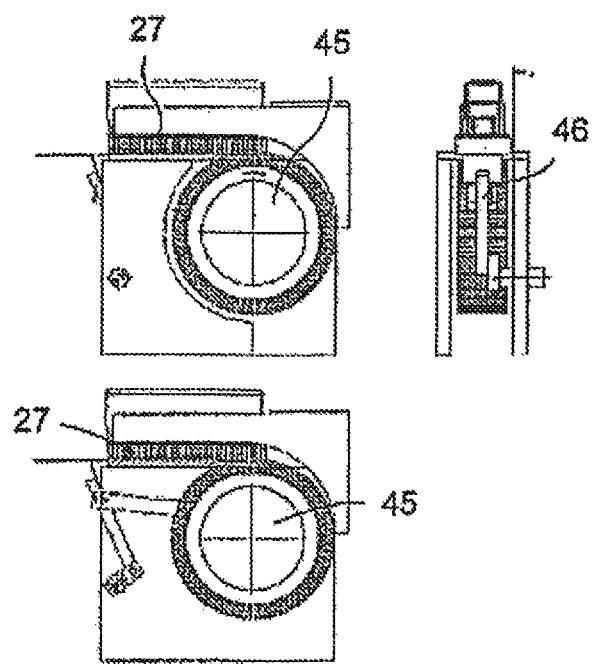

It is also possible for the wire mat 27 to be wound directly onto the pressing tool 45; the embodiment according to FIG. 23 is intended for this purpose (there are three manifestations shown here). To carefully insert the wire mat 27 into the receiving tines of the pressing tool 45, guide rolls or castors 46 are provided which carefully roll off on the outside of the wires. It is provided that stamped or preformed insulating paper is fed in and held and transported using two moving rakes. The folded insulating paper is transferred by the rake to an auxiliary tool.

The attractive feature of the arrangement is particularly that the insulating paper is applied onto the pressing tool 45 and pre-mounted prior to installation of the wire mat in the stator after the wire mat 27 is already located on the pressing tool 45.

The claims now submitted with the application and those submitted later are not prejudiced against further attainment of further protections.

If upon closer inspection here, in particular inspection of the related prior art, it is found that one or another feature is indeed favorable for the purpose of the invention, but not decidedly important, of course a formulation will be sought that no longer contains such a feature, in particular in the independent claim. Such a subcombination is also covered by the disclosure of this application.

It should be further noted that the designs described in the various embodiments and shown in the figures, and the variants of the invention can be combined together in any way. As such, individual or multiple features can be exchanged with one another arbitrarily. These featural combinations are also disclosed.

The antecedent references made in the dependent claims refer to the further development of the object of the independent claim through the features of the respective dependent claim. However, these are not understood to obviate independent, objective protection for the features of the referring dependent claims.

Features that were only disclosed in the description or individual features from claims that encompass a number of features can be incorporated into the independent claim or claims at any time as being significant to the invention for delineation against the prior art, especially if such features were mentioned in connection with other features or if they achieve especially favorable results in connection with other features.

What is claimed is:

1. A method for producing a component of an electric machine, comprising a wire mat formed of a plurality of wires, comprising the following steps:
   arranging the plurality of wires in a first sequence;
   switching the positions of the wires to form a new, second sequence that differs from the first sequence; and
   wherein before the pairwise switching of the positions of the wires, each second wire is deflected in a separate plane, and then crossed over the respective first wire.

2. The method according to claim 1, wherein a pairwise switching, of the positions of the wires is provided for forming the second sequence.

3. The method according to claim 1, wherein the electric machine is a stator.

4. The method according to claim 1, wherein the wires are flat wires.

5. The method according to claim 4, comprising the following steps:
   aligning the flat wire; and
   twisting the flat wire in sections about its longitudinal axis in such a way that a first untwisted section of wire is formed between two twisted sections.

6. The method according to claim 5, comprising the following step:
   after twisting, a z-shaped angling of the flat wire takes place in sections.

7. The method according to claim 6, comprising the following steps:
   winding the flat wire on a carrier, after twisting; and
   transferring the wire mat thus produced onto a mounting tool.

8. The method according to claim 7, wherein the wire is helically wound.

9. The method according to claim 6, comprising the following steps:
   winding the flat wire on a carrier after the z-shaped angling; and
   transferring the wire mat thus produced onto a mounting tool.

10. The method according to claim 9, wherein the wire is helically wound.

11. The method according to claim 6, wherein the switching of the sequence takes place before the z-shaped angling.

12. The method according to claim 1, comprising the following step:
   mounting the wire mat in the component in such a way that second untwisted wire sections of the wire mat are introduced into grooves of the component, the second untwisted wire sections of different grooves of a flat wire section are connected by an angling and the angling accommodates at least partially the first untwisted wire section.

13. The method according to claim 1, wherein before, during or after the deflection of the respective second wire, a wire stock is formed in said second wire.

\* \* \* \* \*